United States Patent
Gaskarth et al.

(10) Patent No.: US 7,957,718 B2
(45) Date of Patent: Jun. 7, 2011

(54) METHOD AND APPARATUS FOR TELECOMMUNICATION EXPENSE MANAGEMENT

(75) Inventors: Norman Gaskarth, Calgary (CA); Anton Gankovsky, Calgary (CA); Igor Visser, Calgary (CA)

(73) Assignee: Wmode Inc., Calgary, Alberta (CA)

( * ) Notice: Subject to any disclaimer, the term of this patent is extended or adjusted under 35 U.S.C. 154(b) by 480 days.

(21) Appl. No.: 12/222,850

(22) Filed: Aug. 18, 2008

(65) Prior Publication Data

US 2009/0291665 A1 Nov. 26, 2009

Related U.S. Application Data

(60) Provisional application No. 61/071,873, filed on May 22, 2008.

(51) Int. Cl.
*H04M 15/00* (2006.01)
(52) U.S. Cl. ...... 455/405; 455/403; 455/411; 455/550.1
(58) Field of Classification Search .................. 455/405, 455/403, 407, 410, 411, 412, 1, 412.2, 566, 455/414.1, 550.1
See application file for complete search history.

(56) References Cited

U.S. PATENT DOCUMENTS

| | | | |
|---|---|---|---|
| 6,671,508 B1 * | 12/2003 | Mitsuoka et al. | .......... 455/412.1 |
| 6,925,160 B1 | 8/2005 | Stevens et al. | |
| 7,113,767 B2 * | 9/2006 | Vaananen | .................. 455/412.1 |
| 7,174,164 B1 | 2/2007 | Knoop | |
| 7,343,568 B2 * | 3/2008 | Jiang et al. | .................... 715/854 |
| 2005/0043065 A1 | 2/2005 | Bekanich | |
| 2008/0070548 A1 * | 3/2008 | Cha et al. | ...................... 455/411 |

FOREIGN PATENT DOCUMENTS

WO  WO 2006/034284  3/2006

OTHER PUBLICATIONS

U.S. Appl. No. 10/611,273, filed Jan. 27, 2005, Costelio.
U.S. Appl. No. 10/732,358, filed Jun. 24, 2004, Horne et al.
U.S. Appl. No. 10/631,849, filed Sep. 2, 2004, Dorman et al.
U.S. Appl. No. 10/763,832, filed Jan. 27, 2005, Bates.
U.S. Appl. No. 10/964,535, filed Feb. 24, 2005, Whewell.

\* cited by examiner

*Primary Examiner* — CongVan Tran
(74) *Attorney, Agent, or Firm* — Antony C. Edwards

(57) ABSTRACT

The user of a handheld wireless communicator, for example a cell phone or so-called smartphone completes a call or email or other communication event. The event is timed by the device or the duration is calculated, or otherwise the event is quantified and the information is stored in for example a log within the device. At the end of the communication event, the telecommunication expense management system provides a pop up user interface asking the user to decide whether to capture the communication event so as to assist in billing the event, to delay capturing the communication event to a future time, to dismiss the communication event as if it had not occurred, or to add the communication event to a list which is of personal interest to the user but which is not in the user's opinion billable or the costs not recoverable or otherwise of a business nature that requires capturing.

45 Claims, 15 Drawing Sheets

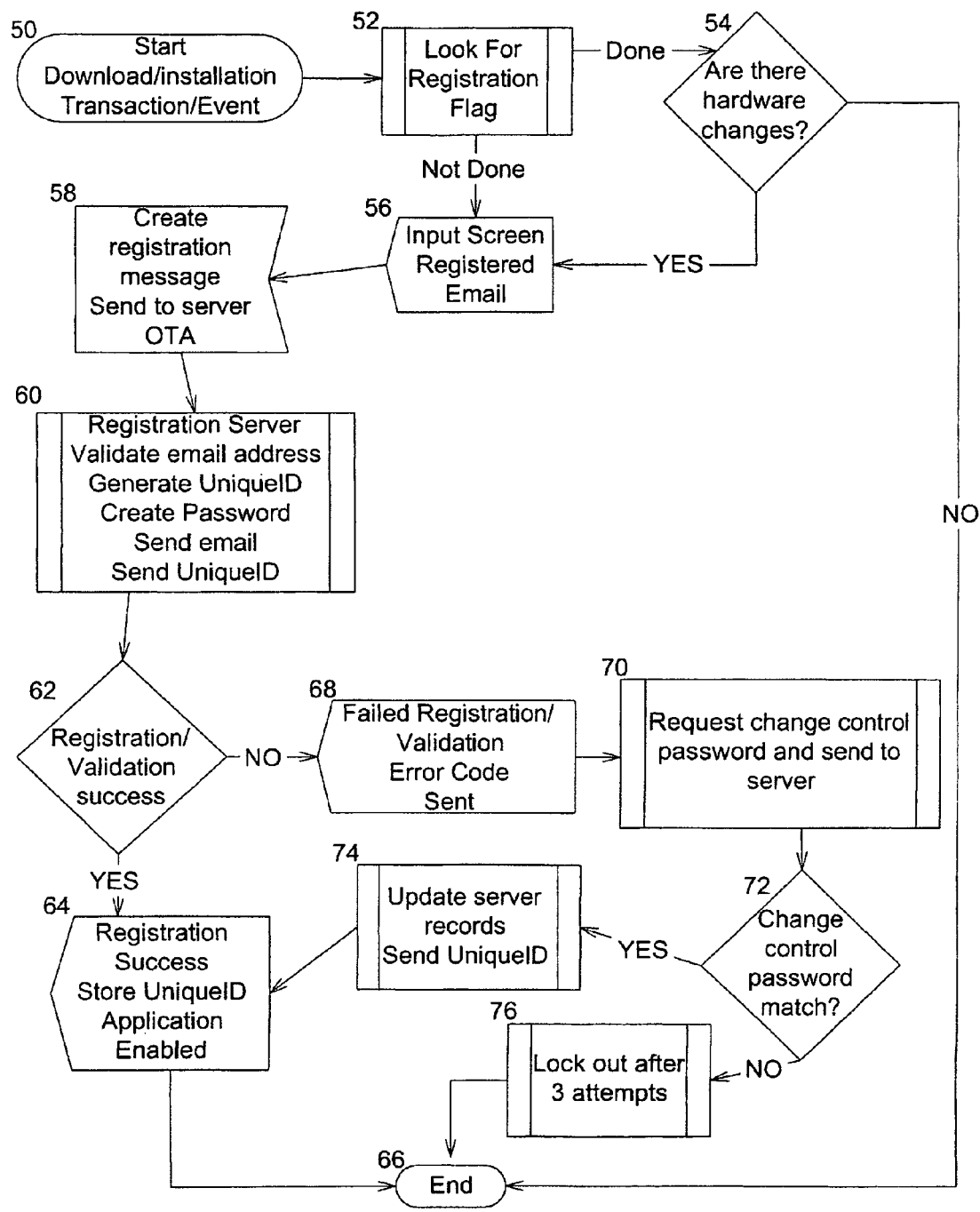

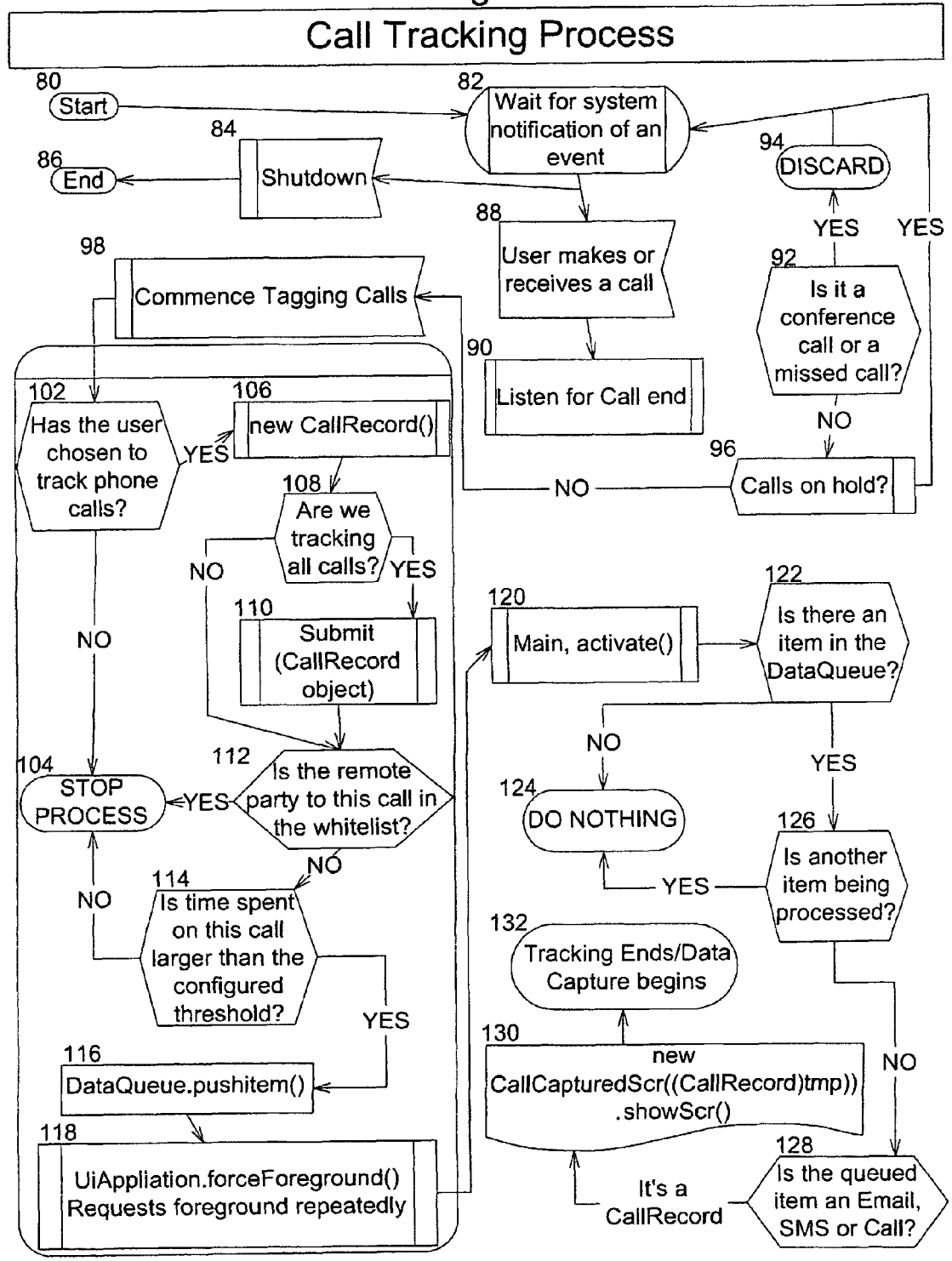

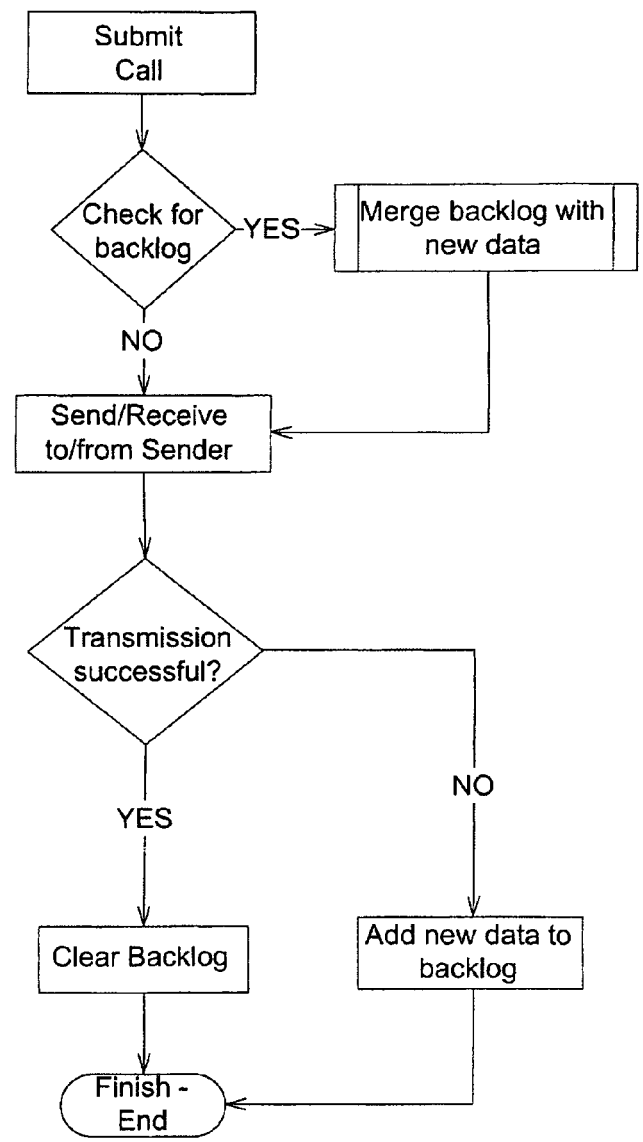

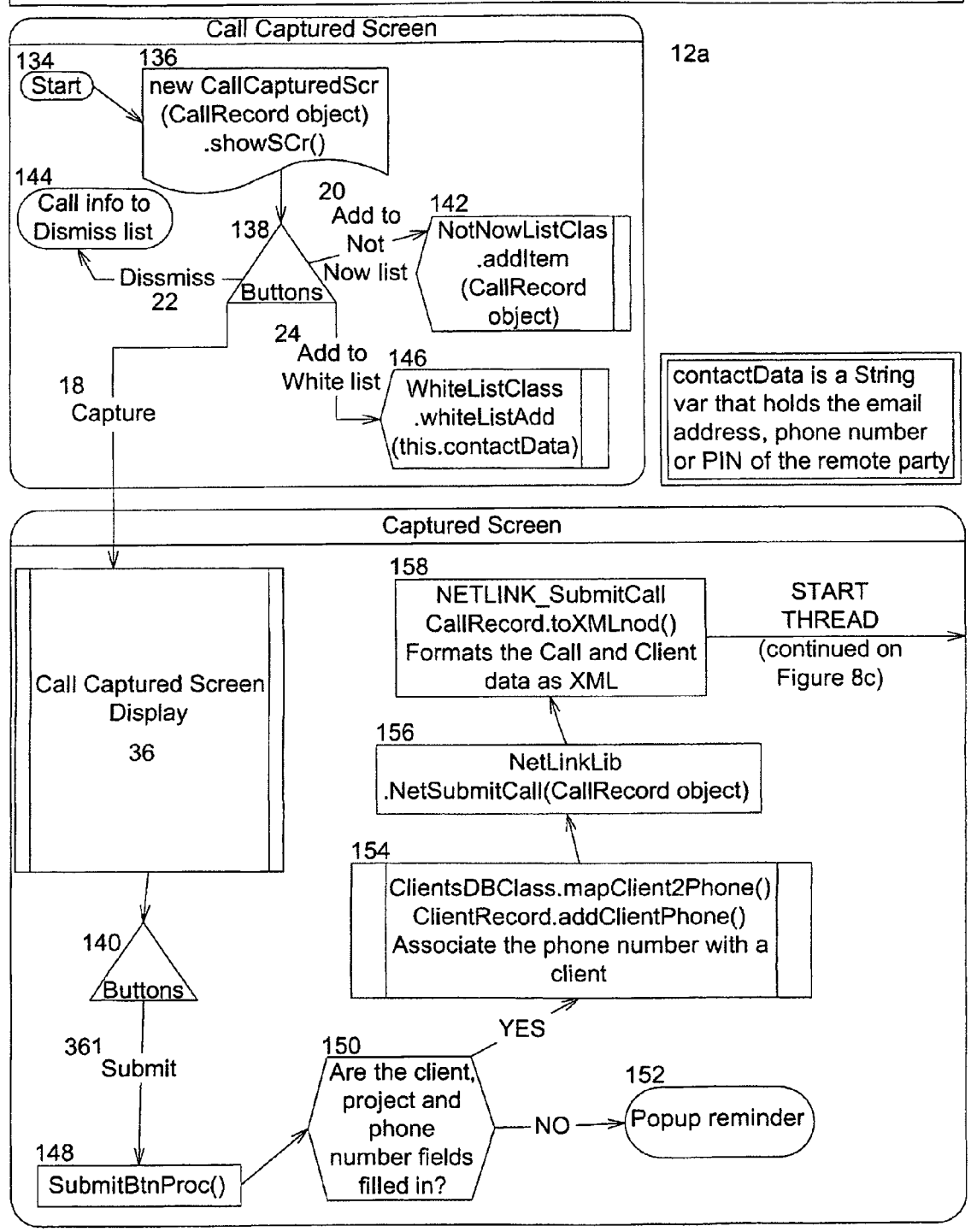

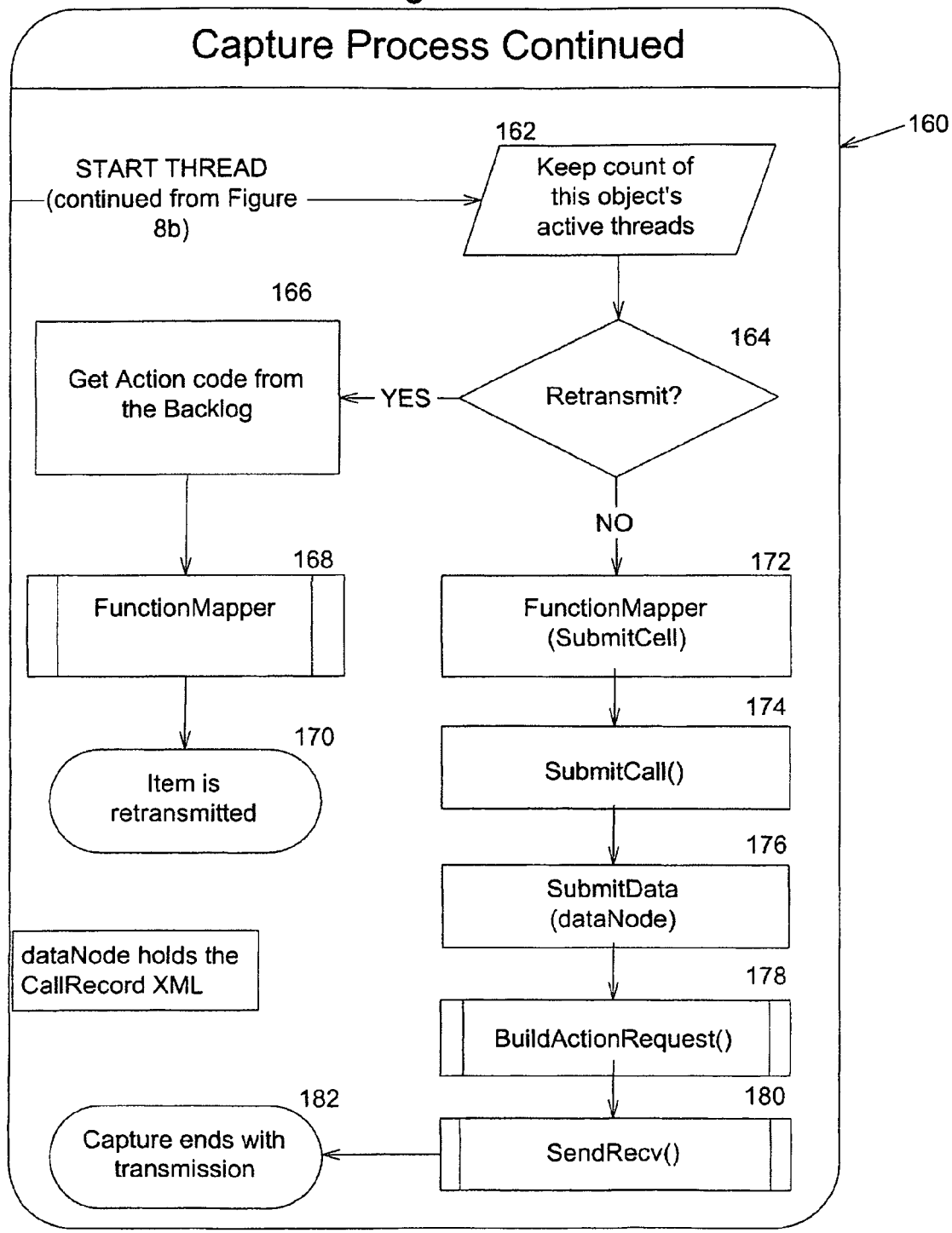

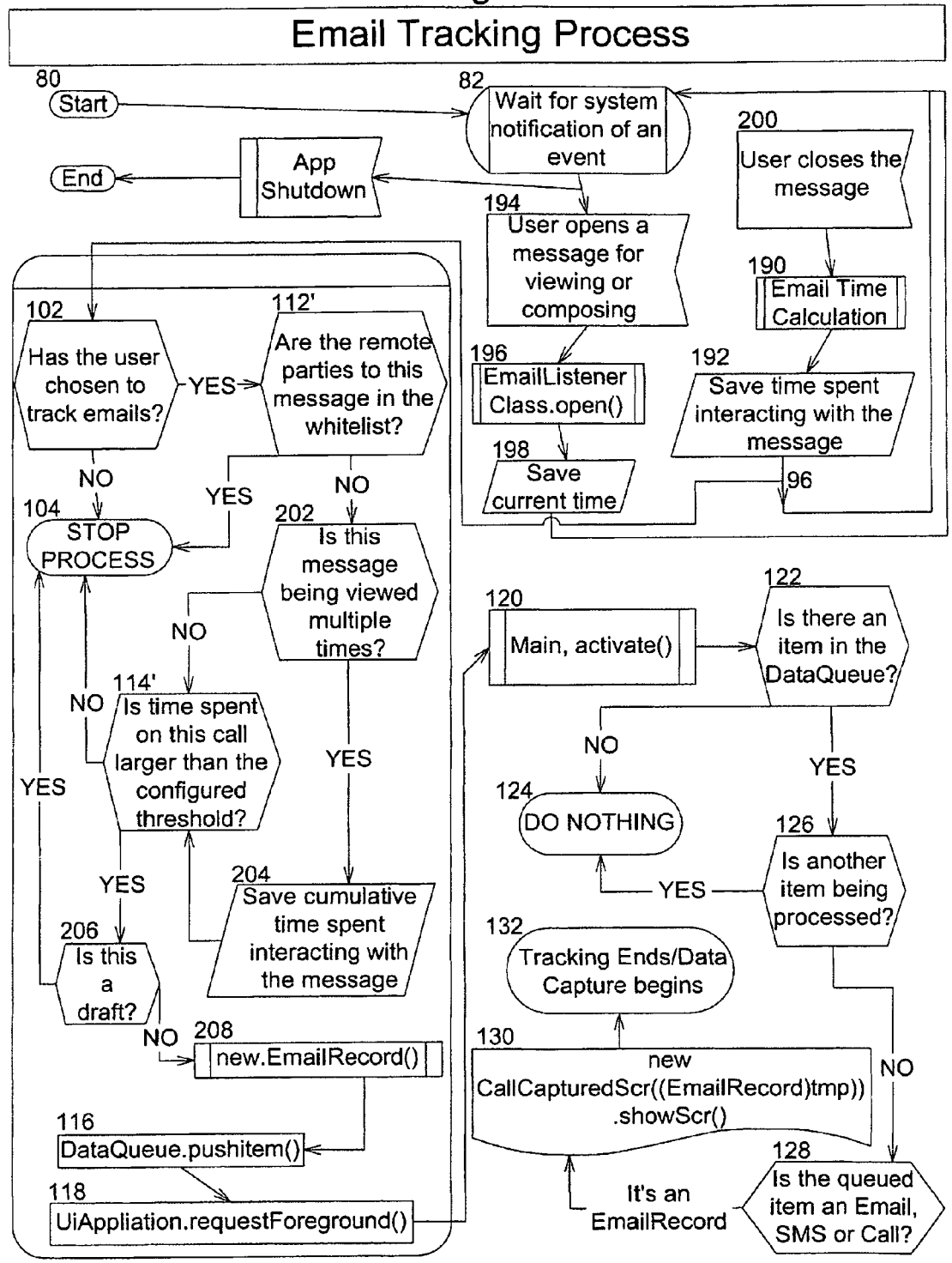

Bill Integration/TEM momentem Report Integration

METHOD AND APPARATUS FOR TELECOMMUNICATION EXPENSE MANAGEMENT

CROSS REFERENCE TO RELATED APPLICATIONS

This application claims priority from U.S. Provisional Patent Application No. 61/071,873 filed May 22, 2008 entitled Method and Apparatus for Telecommunication Expense Management.

FIELD OF THE INVENTION

This invention relates to the field of systems for tracking expenses when using handheld communication devices and in particular to a telecommunication expense management system operating in cooperation between a handheld wireless communicator such as a smartphone and a wireless communication carrier system.

BACKGROUND OF THE INVENTION

It is a cliché that in business time is money. However, cliché or not, in many businesses including those provided by so-called professionals and others of those who offer their services to their customers or clients at an hourly rate, and given the frenetic pace at which in many instances today's business is conducted, the truism becomes "do what you can" and "bill what you do". It is in keeping with this maxim that the telecommunication expense management system according to the present invention is advantageous for capturing what is often lost, namely, the time and costs spent on behalf of clients or customers making cellular phone calls or otherwise communicating by SMS texting or by the sending and receiving of emails using smartphones such as made for example by Research in Motion of Waterloo, Ontario, Canada and sold under the trademark Blackberry™.

In applicant's opinion, the Blackberry™ smartphone devices epitomize the various forms of wireless handheld communication including cellular telephone, SMS, and email, which provide the business user a flexibility to use all of the user's available time during a business day to best advantage. For example, many business users commute long distances to their offices or often are working remotely from their office during the day and use either their commute time or their travel time to make and receive business calls, and also to scan their incoming text and email messages and to respond. What is however missing in the prior art of which applicant is aware, and which is an object of the present invention to provide, is an application working in cooperation with the software within the business user's smartphone so as to provide a seamless user interface which seamlessly integrates into the operation of the smartphone which allows the business user the means to capture his or her time and costs for billing purposes, as the user desires and without interfering with the operation of the smartphone, to provide just one example of the advantages of the present invention.

SUMMARY OF THE INVENTION

The user of a handheld wireless communicator, for example a cell phone or so-called smartphone completes a call or email or other communication event. The event is advantageously timed by the device or the duration is calculated, or otherwise the event is quantified, for example by means of counting text characters, and the information is stored in for example a log within the device. At the end of the communication event, the telecommunication expense management system (herein also referred to by its acronym as "TEMS") according to the present invention provides a pop up user interface asking the user to decide whether to capture the communication event, as better defined below, to delay capturing the communication event to a future time, to dismiss the communication event as if it had not occurred, or to add the communication event to a list which is of personal interest to the user but which is not in the user's opinion billable or the costs not recoverable or otherwise of a business nature that requires capturing.

In summary, the telecom expense management system and associated method for use with a wireless handset having a processor, handset database and user interface and a remote server having a server database wherein the server is in wireless communication with the handset, may be characterized in one aspect as including:

a) means for detecting, or in the method detecting, a communication event, means for determining, or in the method determining, event identification information associated with the communication event, and means for detecting, or in the method detecting, an associated end of the communication event, b) means for detecting, or in the method detecting, the occurrence of a pre-selected event, and then triggering an automatic tagging of the communication event, c) means for automatically tagging, or in the method automatically tagging, the communication event upon the triggering, d) means for providing, or in the method providing, a user a choice after the end and before the occurrence of the pre-selected event, wherein the choice may include choices from the group comprising at least a tagging choice, a process-later choice, a dismiss choice, an add-to-ignore list choice, e) means for maintaining, or in the method maintaining, a process-later list and an ignore list.

The tagging choice may include means for tagging, or in the method tagging, the communication event so as to associate with the communication event a billable quantity corresponding to said communication event, and so as to associate contextual information with the communication event, wherein the billable quantity includes billable quantities chosen from the group comprising: time duration of the event. The contextual information may include at least all of the information in the group comprising: contact information for a remote party communicating with the user during the communication event, project information associated with the remote party and the communication event, a billing rate for the communication event, expenses added by the user, contextual notes added by the user, and wherein the tagging choice further includes a reminder choice chosen from: forwarding a reminder communication containing the contextual information to the user, forwarding a reminder communication containing the contextual information to the remote party.

The process-later choice may include means for listing, or in the method listing, the event identification information in a process-later list and means for the user to later access, or in the method the user later accessing, the process-later list for the tagging of one or more of the communication events in the process-later list. The dismiss choice may include means for identifying, or in the method identifying, the communication event as not requiring tagging. The add-to-ignore list choice may include means for listing, or in the method listing, the event identification information in the ignore list so that future communication events associated with the event identification information in the ignore list do not result in providing the user with the choice. The automatic tagging may include means for tagging, or in the method tagging, of the communication event with the billable quantity and with at least a sub-set of the contextual information comprising: the contact information.

The means for providing a user a choice may include a field containing the remote party's telecom information from the group comprising: phone number, email address, SMS address. The means for providing a choice may further include means for mapping from one of the databases an identity of the remote party corresponding to the remote party's telecom information. The means for providing a choice may further include means for displaying an identification field populated from one of the databases with said identity of the remote party if found. The mapping may be many-to-many mapping.

A means such as an icon on the handset may be provided to present a menu of choices to the user independent of the detection of the communication event. The menu of choices may include menu choices from the group comprising: reviewing a contacts list, reviewing the process-later list, reviewing the ignore list, tagging expenses, tagging activities, requesting reports associated with the communication events, requesting synchronization of the handset database with the server database.

The means for tagging may include means for automatically determining the billable quantity and adding the billable quantity to tagged information tagged to the communication event. The means for tagging may also include means for automatically mapping the telecom information to one of the databases and returning any corresponding contextual information from the databases and automatically adding the corresponding contextual information to the tagged information tagged to the communication event. The communication event may be a call, in which case the telecom information is a phone number, and the billable quantity is elapsed time of the call. The communication event may also be an email, in which case the telecom information is an email address, and the billable quantity is the amount of time an email is open so as to allow the user to read it and the amount of time during which an email is being generated including text being written, whether any segments of the amount of time thereof are contiguous or sequential or piece-meal.

The pre-selected event may include when the elapse of time equates to the preset default time interval, and further includes means for commencing tracking elapse of time from the end of the communication event and comparing the elapse of time to the preset default time interval, and further includes means for detecting when the elapse of time equates to the pre-set default time interval.

The means for providing a user a choice may be made available to the user immediately upon said end of the communication event by means for displaying of a capture screen on the handset, and further include means for over-riding other handset prompts in order to display the capture screen upon the end of the communication event. The means for displaying of the capture screen may include means for displaying: a tagging icon for initiating the tagging choice, a process-later icon for initiating the process-later choice, a dismiss icon for initiating the dismiss choice, and an add-to-ignore list icon for initiating the add-to-ignore list choice. The means for providing a user a choice may further include means for displaying a reporting icon for initiating generation of at least one report to the user. The report may be a summary report. The means for displaying a tagging icon, when selected by the user, may trigger a means for displaying a captured-event screen displaying said telecom identification, said billable quantity, and said contextual information. The means for providing a user a choice may further include means for displaying a synchronization icon for initializing synchronization of the handset database with the server database.

The system and accompanying method according to the present invention may further include:

f) means for gathering and storing, and in the method gathering and storing, identifying information from at least the handset identifying the handset and the user upon installation of a handset program component of the system so as to be resident in the handset and subsequently upon each start-up of the handset, g) means for automatically commencing operation, and in the method automatically commencing operation, of the handset program component of the system upon start-up of the handset, h) means for prompting, or in the method prompting, the user for the user's email address upon installation and storing the user's email address upon installation, i) means for creating, or in the method creating, a unique user identification from said identifying information and storing the unique user identification in the server upon the installation, j) means for creating and storing, or in the method creating and storing, a password for the user upon installation, k) means for comparing, or in the method comparing, the identifying information which has been stored with the identifying information in the handset upon each start-up of the handset and detecting any changes in the identifying information, l) means for prompting, or in the method prompting, the user for the password upon the detection of any changes, verifying the user's input password upon prompting with the stored password, m) upon successful verification of the input password with the stored password then means for re-storing, or in the method re-storing, the identifying information containing any changes in the identifying information whereby the identifying information, including the changes, automatically follows the user upon any changes to at least the handset.

The identifying information may be chosen from the device related information including the IMEI, PIN, ESN, IMSI, user's phone number and Home Zone. The identifying information may include the user's email address once the user's email address has been stored following the installation. The means for creating a unique user identification includes means for creating a hash of the identifying information.

The wireless communication between the handset and server may include:

a) means for sending, or in the method sending, the communication bi-directionally between the handset and server in real time independent of third party middleware but able to pass through third party middleware, b) means for supporting, or in the method supporting, in the communication internal messaging transaction data encapsulated using XML standard but with customized tags for describing the data, c) means for utilizing, or in the method utilizing, a communications stack so as to provide for information to be passed between the handset and server, the information including registration information, transaction information, error codes including network, data and server errors codes and other information including user notifications and updates.

The bi-directional communication may be fault tolerant and incorporate the use of a data backlog and transmission verification enabling incomplete, corrupted or interrupted data transmissions to be resent.

In what follows, the capturing of a communication event is alternatively referred to as "tagging" of the communication event. Thus for example cellular phone users of the TEMS according to the present invention may at their option, once a call ends, tag their cell phone call and allocate the call to a particular client or customer, or to a particular project or file name, or to particular cost centres or for example expense accounts and the like. They may also elect to have reminders sent. The reporting service according to one aspect of the present invention, as better described below, is used to cover the cost of the cell phone call and the billable time of the user which the user may then bill to the client or customer. The reporting service assists the user in making sense of the user's cell phone bill, and also provides a report which may be used for employee accountability, to keep audit trails of calls, to generate reminders of important calls and for follow-ups to those calls, and to monitor the user's cell phone usage as compared to their rate plan provided by the cell phone carrier in realtime so that the user may avoid over-use as dictated by their plan and thereby avoid surcharges.

In the TEMS according to the present invention, mobile call information is automatically grabbed or accumulated by the system and, by a simple two key-click by the user the call is tagged by the user. As better described below, the user is provided with a comprehensive user interface on the handset that gives the user full control of their mobile time, cost, and activity in a simple manner. Using a realtime wireless protocol between the handset and the system server, the user has the ability to generate custom or personalized reports which make sense for the user's particular business rather than relying on the carrier activity reports, which merely allocate numbers and time in a list, and to keep track of the user's usage of call time of the various types available against the user's carrier rate plan so as to avoid over-usage surcharges. The TEMS server provides a backend service that stores and manages the user's call data and also provides alerts to the user as the user's rate plan is used up, the user having the ability to allocate calls including the type of call so as to most efficiently use the user's carrier rate plan. Without the user having to use a computer in order to register with the system and being able to use the system without a required syncing to the server and without the need for a browser, the telecommunication expense management system according to the present invention allows a user to tag billable time and cost for the user's communication events on the handset, it allows the user to organize the user's mobile activity again from the handset, it allows the user to keep tabs on the usage of the various call types under the carrier's rate plan, and allows the user to make better sense of the resulting phone bill from the carrier.

BRIEF DESCRIPTION OF THE DRAWINGS

In the drawings, wherein similar characters of reference denote corresponding parts in each view.

FIG. 6 is a logic flow chart according to one embodiment of the present invention for the registration process according to one aspect of the present invention.

FIG. 7 is a logic flow chart according to one embodiment of the present invention for the call tracking process according to one aspect of the present invention.

FIG. 8a-c is a logic flow chart according to one embodiment of the present invention, which follows on to that of FIG. 7, for the capture process according to a further aspect of the present invention.

FIG. 8a is a logic flow chart, in one embodiment, incorporated as part of the server routine in FIG. 8.

FIG. 9 is a logic flow chart for the email tracking process according to yet a further aspect of the present invention.

DETAILED DESCRIPTION OF EMBODIMENTS OF THE INVENTION

Figure 1:
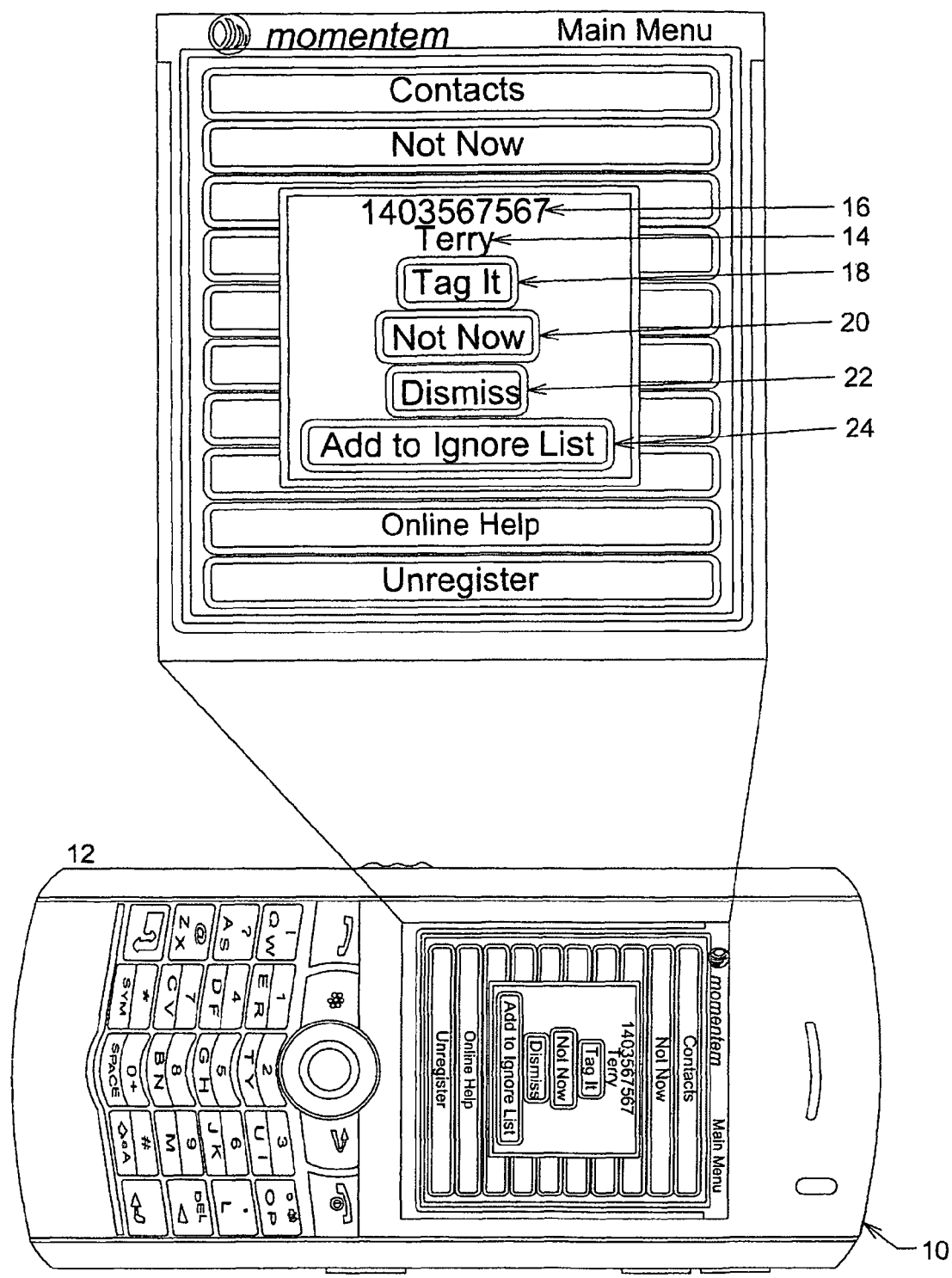
FIG. 1 is a depiction of a handheld wireless communication handset, showing the contents of its screen in an enlarged view, wherein the capture screen according to one aspect of the present invention is illustrated as being displayed by the handset.

The telecommunication expense management system according to the present invention, and herein alternatively referred to by its acronym TEMS, provides a user with the option of tagging a communication event such as a telephone call or an email, and inputting information into the tag regarding the activity of the user. In particular, once a communication event such as a cell phone call ends, the TEMS according to the present invention automatically pops up a user interface onto the screen of the handheld communicator allowing the user to allocate the details of that call, for example, date, time, number, duration, and location information, to a specific client or customer, and project or file reference. Client information is stored on the handset. Information about the call and a copy of the client information is stored in a backend server. Once a cell phone call is disconnected, the data is stored in the call log is read and that data is used to populate the pop-up screen. The user then adds information to the pop up. The user interface as described better below, requires only a couple or few key "clicks", in other words, only a couple or few user button selections or screen icon selections or other means on the handset for communicating a choice to the software within the handset processor at the end of the user's call. The user can flag that the cost of the call or the time spent on the call is billable to the client or customer, and can request an instant email reminder of the call to be sent to the user's email address, and/or to the third party communicator's email address. The user can also type notes about the call. All of this information will be associated with the call and sent to the server for storage and later retrieval via handset reports or emailed reports. Client information is stored on the handset. Client information is also sent to and saved on the server. That information can be retrieved via the Sync function in case the users device malfunctions, or the user gets a new phone etc.

In addition to being able to flag the cost of a telephone call, or the time spent on a telephone call, which is billable to a client or customer, and in addition to being able to request a contemporaneous email reminder of the telephone call to be sent to the user's email address, and being able to type notes about the call, the TEMS according to the present invention in a further aspect has the option for the user to direct the tagged call into a list for processing later (shown herein as a "not now" list which is not intended to be limiting) or the ability to dismiss a particular call if that call doesn't need to be tagged and to add a particular caller to a personal or non-billable list (referred to herein as a "white" list, which is not intended to be limiting) so that calls from that caller's number no longer trigger a pop up screen asking whether the user wishes to tag the call. In addition to tagging voice calls, the TEMS of the present invention may also tag the time spent on emails, SMS messages, PIN messages, etc., and allows the user to manually input expense items and notes for example about face-to-face meetings and other non-call activity. The notes may provide context for the call. Where location information is available, such as for example GPS co-ordinates for a GPS enabled smartphone, that information is added to the transaction information automatically if the user decides to turn that function on.

Whenever the user tags a communication event the entire captured information is sent wirelessly (alternatively referred to as over-the-air or "OTA") to a remote TEMS server, alternatively referred to as a "Momentem"™ Server, where it is securely stored. In one embodiment of the present invention, a user may attach voice notes and other files such as images and documents to tagged call records, for example, so as to attach some notes to a call or a picture of a receipt to an expense item so as to maintain record of taxes paid, etc. The image sent to the server may then be "read" by optical character recognition software and once read sent to for example an accounts payable clerk or other bookkeeping entity.

Using the TEMS according to the present invention, a lot of processing is done in the wireless communicator handset relieving the requirement to always sync the handset to the TEMS server. The handset is backed up to the TEMS server in real time. Whenever the user modifies contact information on the handset, or any information on the handset, the new edited information is sent to the server for storage and safe keeping. Then if the user loses his phone or buys a new one all that up-to-date information can by synced back down the new handset. Also, in preferred embodiments of the present invention, the user uses the handheld communicator as the only necessary interface with the system commencing with registration using for example the registration screen of FIG. 1a. Preferably the user is provided with the option to configure user interface screens, default time settings, and to edit client lists and project lists on the handset. The information is synchronized wirelessly to, and backed up to the server.

Depending on the default time settings, and at the option of the user, calls to and from the handset may be automatically tagged as better described below using "blind tagging" irrespective of whether the user actually tags the calls. In addition, if global positioning system location information is available within the handset, the TEMS according to the present invention may attach such GPS information to a tagged record.

Further, the TEMS according to the present invention also accumulates or procures other handset information from the handset and sends it during a registration process better described below, and periodically thereafter, to the TEMS server. Such information includes the handheld device's serial numbers, home carrier information, and information about the type of the device and its operating system and version so as to enable the TEMS to better manage the user accounts in an intelligent manner. For example, if a user changes device, the TEMS may detect the change and address it appropriately. This makes the TEMS useful for inventory control purposes within large corporations. There are whole companies built around the management of mobile device inventories, and this is done manually. The TEMS software enables the automatic tracking and dynamic updating of such information. In addition, the TEMS monitors the amount of data usage by the user to therefore enable control of the cost of the data usage, for example, by detecting and warning the user as the amount of data available under the user's carrier plan is used up and before surcharges are applied.

In further preferred embodiments, the TEMS may identify calls as being local, long distance, roaming, international, etc. Users may then allocate these calls made or received to minimize their cost as they may be allocated to portions of their service plan as appropriate for example so as to use available numbers of local minutes, the number of incoming minutes, the number of roaming minutes when abroad, etc. and the TEMS enables the user then to keep track of whether the user's usage of the appropriate minutes are exceeding those available under the user's carrier plan, and in realtime, so that the user may take steps to avoid over-usage surcharges.

In conjunction with the TEMS server, the user may query the server and generate reports back to the handset so that the user may review the reports "on the fly". Once a query has been entered by a user into the handset, the query is sent wirelessly to the TEMS server so as to interrogate the server database, the server returning the resulting report and the handset displaying the results of the report. Thus reports may be generated in a useful fashion for the user to know, for example, how much time the user has spent on a particular client or customer within a particular timeframe, or how much billable time and fees have been generated as work in progress to be billed to a particular client, or for example a user may ask how many long distance minutes has the user used since the date of the user's carrier billing cycle. The results are displayed on the handset screen in a simple graphical user interface.

With respect to the TEMS server, the TEMS server is a repository for all of the user's data, including the user's tagged call records, expenses and activities, and for the user's device information such as the device serial number etc. The server also stores all of the user's client and project information that has been input by the user. The server may also provide automated reports such as on-demand or weekly reports listing all of the user's tagged activity, which are sent to the user via email so that the user may have a full summary of all events in a single list which the user then incorporates into invoices to recover fees for time spent, and to recover costs, and to for example produce management reports, or simply to look up important calls or analyze usage of time by client or customer, or by project or file, or so as to compare billable versus non-billable time and events etc.

The server may also send instant email reminders of tagged calls that were flagged as "remind me" calls. The server also provides a web portal for the user to log onto to view their tagged call activity in a calendar view for example. As stated above, the server also interacts with the wireless handset so as to generate for the user-on-handset reports as desired by the user. The server may also interface with other systems, using data interchange formats and application programming interfaces, although this is not intended to be limiting as one skilled in the art would know that there are other means for sharing information between server databases. Other systems the server may interface with may include CRM/ERP systems, carrier billing systems, or other expense management systems or accounting systems. Otherwise, the server may for example take in data from the carrier system, such as monthly billing from the carrier, and interpret the billing information so as to merge it with the enhanced information provided from the TEMS system according to the present invention, so that a user is provided not merely with a list of telephone numbers called and time spent, but with tagged information which corresponds to those calls made or received.

Incorporating the TEMS according to the present invention into a user's handset is quickly done by the user from the handset alone. Firstly the user goes to the web address provided by the carrier or service provider and the user then downloads the TEMS application into the handset. Once installed, the TEMS software now resident in the handset invites the user to register which merely entails the user entering the user's email address and name and clicking on the "register" button displayed on display 12. The TEMS then creates a new account on the server for the user and the user may then begin using the TEMS from the handset.

Figure 1A:
FIG. 1a is a User Registration Screen according to the present invention.

The TEMS, once installed, resides in the background on the handset waiting for a communication event such as a call, email, text message, etc. When the user either makes or receives a call, or other communication event, once the event commences and has a duration longer than a threshold time, for example, a default time may be set as five seconds for a telephone call (and may be reset by the user to decrease or increase the threshold time), a TEMS capture screen such as seen in FIG. 1 will pop up once the communication event has ended. Thus for example if the communication event is a phone call, once the call ends, a capture screen 12a will be displayed on the display 12 of the wireless handheld device or handset 10. The phone number called from the call log in the handset is displayed and if the identity of the other party to the call is known and contained within the handset database, that information which has been mapped to the phone number is also displayed and if not the field is left open for filling in by the user during the first such event and thereafter will be auto-filled into the field.

Thus as seen in FIG. 1, the capture screen 12a is an example where the other party to the call is unknown to the handset database. Where the identity of the other party to the call has been mapped to the number within the handset database, the identity field 14 would be filled in with that party's name so as to reside beneath the corresponding phone number 16, although of course it not intended that this particular format be limiting as other formats in capture screen 12a would also work.

If the blind call tagging is enabled, and the user wishes the call to be allowed to be blind tagged, then the user merely does nothing and after a preset period of time the TEMS software in the handset automatically tags the call. The handset is then freed up for further use. Blind Tagging captures all events, all the time, every time and sends the available information to the server. The constraint on blind tagging is the length of call parameter configured by the user. Blind tagged calls are not sent to the Not Now list6 for processing at a later time, they are sent directly to the server for storage. The user may review blind tags in the context of editing a report. Blind Tagged calls are identified separately from other calls on the reports.

Where the user wishes to manually tag the call, the user merely clicks on the tag button or icon, shown in FIG. 1 as the "capture" button 18, although this is not intended to be limiting as the button may be labeled with other text indicators such as for example "tag it" or the like. Thus in the illustrated example, which again is not intended to be limiting, the user highlights capture button 18 and clicks on it by pressing an enter key or roller ball or the like on handset 10.

The user may take an alternative path, and rather than manually capturing or tagging the call, or allowing blind tagging of the call; the user may click on the "not now" button 20 which assigns the tagged call to a list for later processing by the user. Thus if the user is busy immediately following the end of the communication event such as a telephone call (for example if there is a second call on hold), or for example if the user is driving and it would be unsafe to process the captured call as soon as the call has ended, the tagged call is usefully sent to the "not now" list and the user can later address whether the user wishes to enter comments into the appropriate fields to add context to the call or the like as better described below at a later time when it is convenient or safe to do so.

Further alternatively, if the user has no interest or need to tag a particular communication event such as a telephone call at all, the user may then click on the "dismiss" button 22 in capture screen 12a so as to tell the TEMS that the communication event is not to be tagged but rather to be totally ignored. Lastly, if the communication event, for example a particular call from a particular telephone number, is of a personal or otherwise non-business nature, and the user has not already done so so that the contact is recognized by the system by mapping of the telephone number 16, the user would add the phone number to an "ignore" list or "white" list so that the TEMS software would not again pop up capture screen 12a for calls to or from that particular contact. For example, telephone numbers mapped to members of the user's family would be entered into the ignore list once by the user and thereafter the TEMS software, because of that mapping, would know to ignore such communication events and not to interrupt the user with capture screens 12a. Thus the first time a call is made or received from someone who the user wishes to add to the ignore list, upon the capture screen 12a popping up upon the first such call, the user would click on the "add to white list" button 24 so that the TEMS software would know to map the contact to the ignore list.

In a similar fashion, once the user has completed the contact identification fields for a particular contact telephone number in the event of a telephone call communication event, or an email address in the event of an email communication event, etc., the TEMS by the use of the mapping of the handset database to that contact, will auto-fill the contact identification into the appropriate fields so that the information only has to be entered once by the user. Not only is contact information (name and phone number) auto filled on subsequent calls but so are all the other settings first input by the user. These initial inputs become the default entry for all subsequent calls/emails until the user changes them—at which time the new entry becomes the default auto filled entry. These fields include project, bill time, bill cost. The email reminder is not auto filled, nor is the notes field. Thereafter the tagging of calls for that particular contact or for a particular project is automated and so the user obtains meaningful tagging with for example merely two clicks on the handset. All contacts information can be edited and/or appended via the contact manager screen.

Figure 1B:
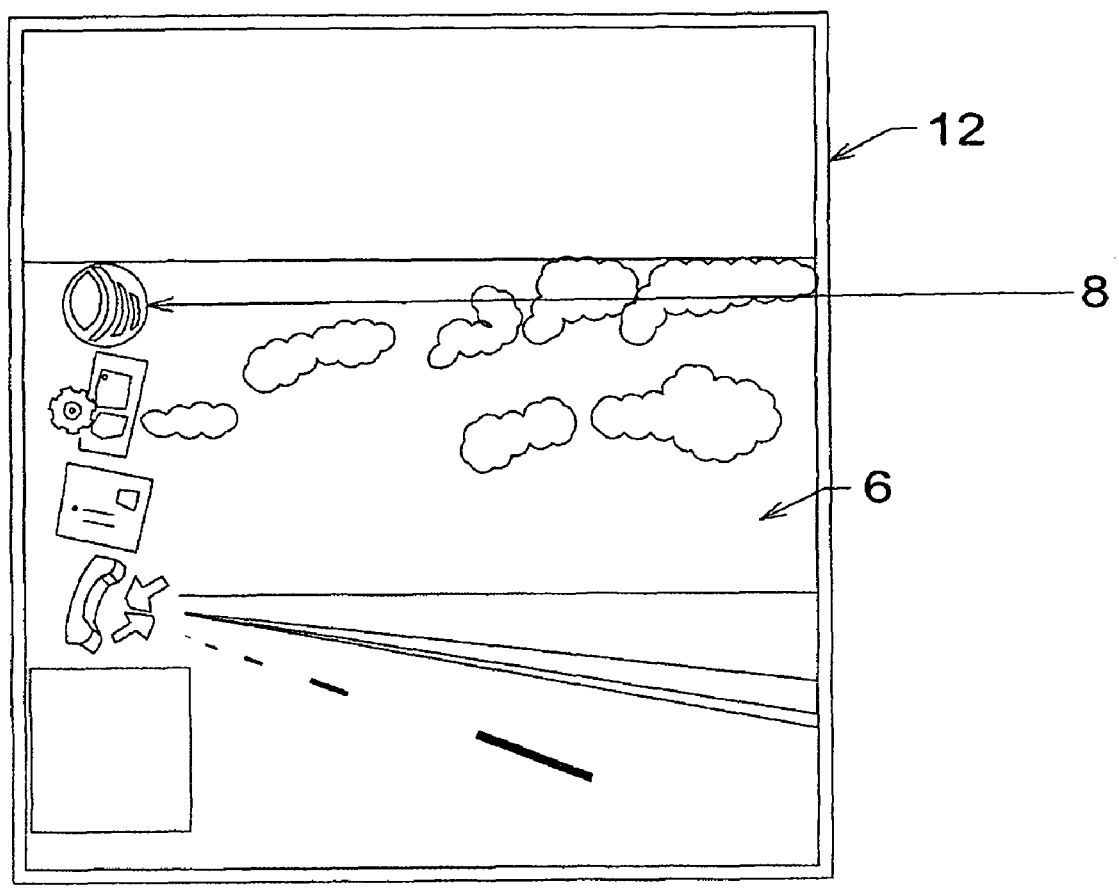
FIG. 1b is a depiction of a wireless communication handset starting screen, commonly known as a "Home" screen.
Figure 2:
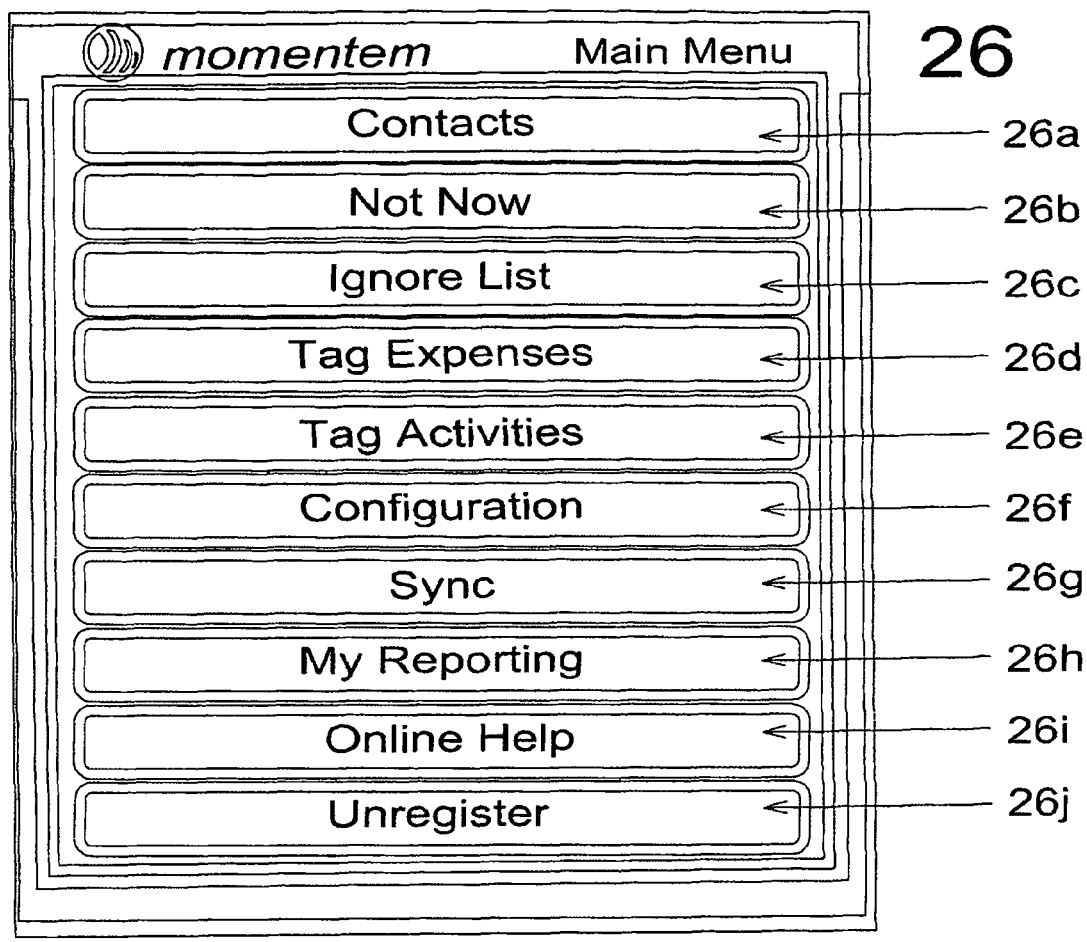
FIG. 2 is a main menu screen according to the present invention.

In one embodiment, when capture screen 12a pops up on the handset display 12 at the end of a communication event on the handset display 12, the user may also be presented with other activity buttons such as for example those also available in main menu screen 26. The main menu may also be launched any time by clicking on icon 8 (the depiction of which is not intended to be limiting) on the handset home 6 corresponding to the TEMS according to the present invention as seen in FIG. 1b. Thus for example, and what are not intended to be limiting, the available options to the user upon the pop up of capture screen 12a are a "clients" button 28, a "reporting" button 30, a "synchronize" button 32 and a "configure" button 34. Thus as seen in FIG. 2, main menu 26 has the following buttons in, respectively, their order of appearance (although this is not intended to be limiting): "contacts", "not now", "ignore list", "tag expenses", "tag activities", "configuration", "sync", "my reporting", and "online help", to which have been assigned reference numerals 26a, 26b, 26c, 26d, 26e, 26f, 26g, 26h, and 26i respectively. In one alternative embodiment, and unregister function, and corresponding "unregister" button, may be provided.

Figure 3:
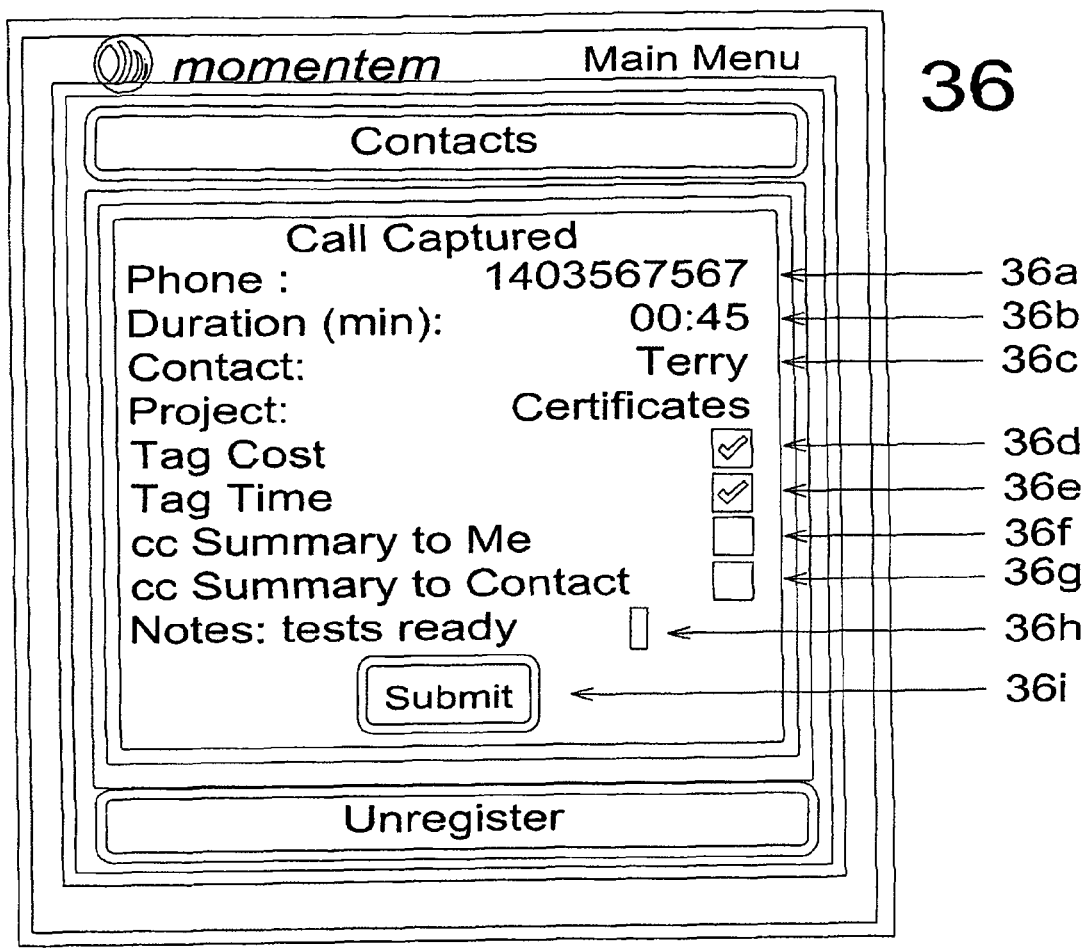
FIG. 3 is a call captured screen according to the present invention.
Figure 4:
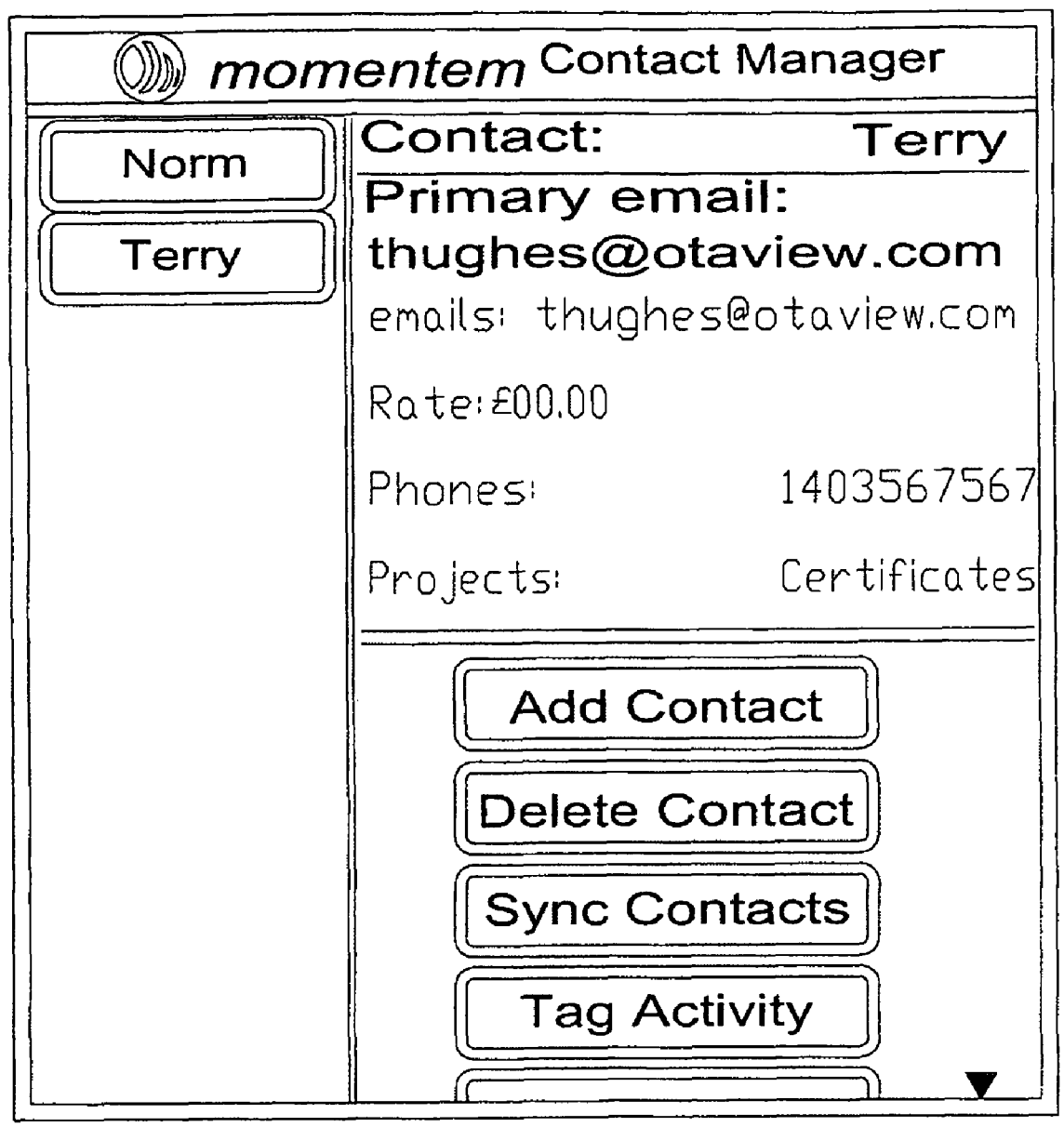
FIG. 4 is a contact manager example contact screen according to the present invention.

Clicking on the contact button 26a allows the user to review and edit all of the user's contacts, as seen by way of example in FIG. 4, noting that these contacts are different from the user's "address book" contacts as they are specific to the TEMS handset database and thus often different from the user's contact manager. The user can in the TEMS handset database add information for example the user's hourly rate for each contact so that the TEMS may automatically calculate how much that particular client or customer is being billed corresponding to the captured time for that customer or client and thus show that work in progress to be billed in a report. The "not now" button 26b provides the user access to the "not now" list where the tagged calls were placed when the user clicked on the "not now" button 20 in capture screen 12a at the end of a particular communication event for later processing. Thus when it is convenient for the user to do so, the user clicks on the TEMS icon on the handset display 12 to thereby bring up main menu 26 and then clicks on the "not now" button 26b which brings up a screen showing the tagged calls to be processed by the user. Thus for example the user at that point may be presented with a "call captured" screen 36 such as seen in FIG. 3.

In the illustration of FIG. 3, a fictitious contact and corresponding phone number and project name have been added by way of example only. Thus for a particular phone number to which a call was made for the first time or from which a call was received for the first name, the contact field and the project field would be blank in the corresponding call captured screen 36 until the user typed in the contact name and the project name (if any) corresponding to that particular phone number, and thereafter the contact and project would be mapped to that phone number and auto-filled into those fields for future call tagging from that number. In the illustrated example of FIG. 3, call captured screen 36 allows the user to select whether the user wishes to tag the cost to be associated with the call, and whether the user wishes to tag the time to be associated with the call, and whether the user wishes to have a summary of the call emailed to the user, and whether the user wishes a summary of the call to be emailed to the contact by, respectively, toggling or selecting the check boxes for corresponding fields 36d, 36e, 36f, and 36g. As seen in illustrated embodiment FIG. 3, the phone number, the contact name, and the project name fields are, respectively, denoted by reference numerals 36a, 36b, and 36c. In a preferred embodiment, a field 36h is also provided for the user to type in notes associated with the call (or associated with other forms of communication event where the event is other than a call). A user may usefully type in notes into field 36h so as to add context to the communication event for later reference or for later ease of billing to the client or customer, etc. Once the fields have been completed as necessary by the user, the user merely clicks on the "submit" button 36i and the information is entered into the handset database. In the case of emails, rather than the user's name being presented the user's email is shown and the subject line is automatically input into the notes field. When an email has multiple recipients all are shown and selectable. The reason for this is that an email may contain many people on the "to:" line and the person who is going to be billed may not necessarily be the first on the "to:" line. Therefore it is important to be able to select the correct individual to be billed.

The "ignore list" button 26c gives the user access to a list of phone numbers or other identifiers such as email addresses selected by the user to be ignored when the user clicked on the "dismiss" button 22 in capture screen 12a. Individuals who appear in the ignore or white list can be removed from that list with all information remaining intact. A contact's email and phone number are separate entities. Therefore a contact's phone number may be in the ignore list so phone calls will not be billed, but still bill for emails sent by that contact.

Clicking the "tag expenses" button 26d gives the user the ability to manually type in expense items and have them appear in the same reports as all the other forms of activity available to the user within the TEMS according to the present invention. Thus the user may when convenient to the user tag particular expense items for example meals, travel, accommodation, etc. to a particular contact or project and rather than the user then having to worry about accumulating a multitude of receipts, the expenses are being accumulated for the user in the server database for later generation of a corresponding report summarizing all the expenses corresponding to the selected contact or project. In one embodiment, where the handset is enabled with an appropriate camera, the TEMS according to one aspect of the invention may also tag a photograph of for example a receipt for ease of accumulation, tagging and later reporting of those expenses including actual reproductions of the receipts without the user having to worry about keeping the physical receipts to hand. The imaged receipts may be useful later for tax purposes when reporting to the appropriate taxation authorities.

By clicking on the "tag activities" button 26e, the user has the ability to manually type in comments about for example face-to-face meetings or other things of note which the user will find useful in having tagged and correlated to a particular contact or project so that the comments may be usefully later reported along with all other activity for that particular contact or project.

When the user clicks on the "configuration" button 26f, similar to the configure button 34, the user is presented with configuration options for the TEMS software that allow the user to change parameters including pre-set timers, the setting of alarms when the user is to be warned that for example data usage is accumulating and over-usage is imminent, etc.

When the user clicks on the "sync" button 26g, the user may then synchronize the handset from the TEMS server. The sync function is a one way function, that is, information is brought down from the server database and populates the handset database. In that embodiment data from the handset is not uploaded to the server using the sync function. Rather, all information captured on the handset is uploaded to the TEMS server database in real time, each time a tagging/transaction or event is tagged or captured. That way there is always a complete, reliable backup in existence and all reporting functions are always accurate and up to the minute.

Figure 5:
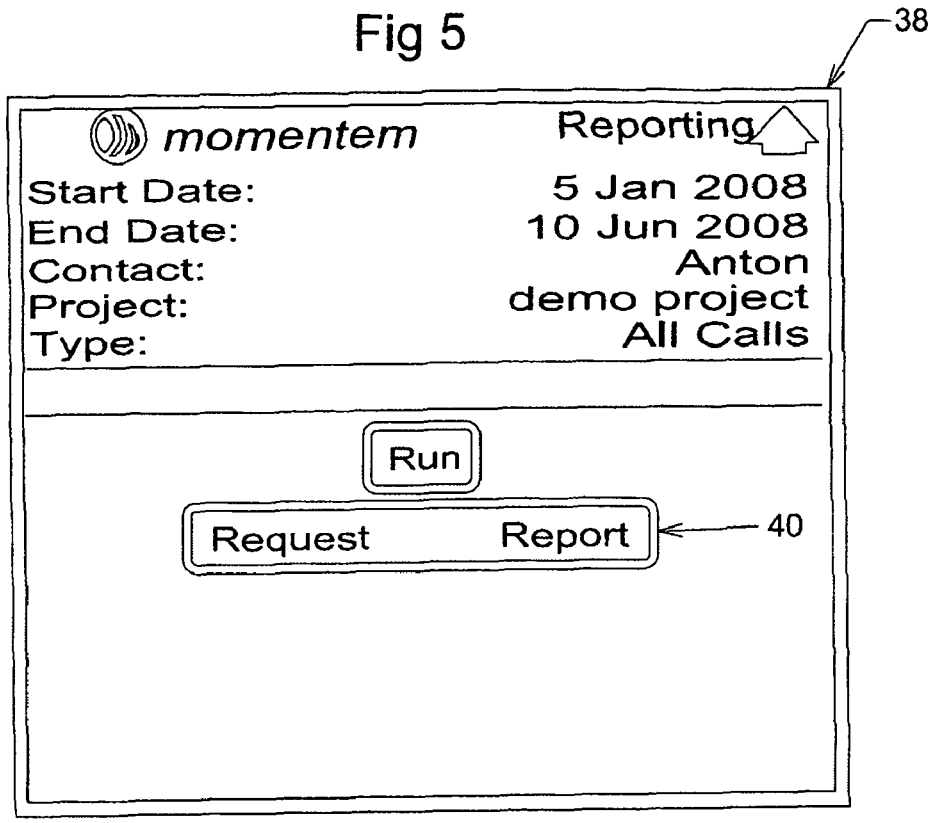
FIG. 5 is an example of a summary report for a tagged call according to the present invention.
Figure 5A:
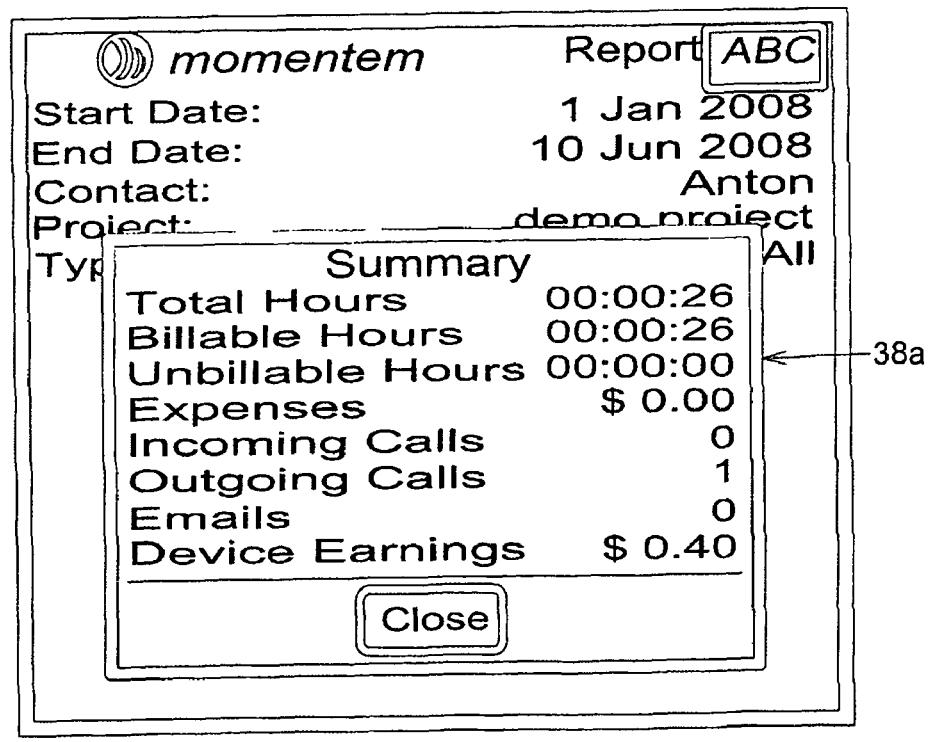
FIG. 5a is an example of a spreadsheet report summary according to the present invention.

When the user clicks on the "my reporting" button 26h, the user is then prompted to generate the user's own database query which is then sent wirelessly to the TEMS server in realtime. Thus for example the user may select to be shown a report on all calls made in a particular period of time relating to a particular contact or project which will then result in a report being generated by the TEMS server and sent back to the user's handset 10 and displayed on the handset display 12. In a preferred embodiment, the user may be first presented with a summary window such as seen in FIG. 5, again for a fictitious contact and project, which, in one embodiment, will provide a summary of the total hours, billable hours, unbillable hours, expenses, incoming call number, outgoing call number, number of emails, and accumulated earnings tagged by the device. The user may then also request a spreadsheet report by clicking on the "request report" button 40 in summary screen 38. Clicking on button 40 sends a request to the TEMS server which then generates a spreadsheet report summary 38a which is emailed back to the user and displayed on display 12 as seen in FIG. 5a. The user may then manipulate the report using the corresponding spreadsheet software application in the handset. The user may also manipulate the report using the corresponding spreadsheet software application on their personal computer.

The user may also click on the "online help" button 26i which may for example bring up a help menu maintained within the handset or may alternatively direct the user's query through a web portal to a web based help facility for example maintained in the TEMS server.

In an alternative embodiment, the user may also click on "unregister" button 26j if the user wishes to disable the operation of the TEMS software in the handset until such time as the user wishes to re-register, which may be simply done as described above and as better described below for the initial registration process.

Thus returning to a reference to FIG. 3, it will be understood that the handset database is capable of mapping or allocating multiple contacts and projects to a single phone number. Thus when processing a tagged call the user may select the appropriate contact and project name, or may select the appropriate project name allocated to the same contact or vice versa all of which may be associated with the same phone number and the appropriate information then added to the appropriate contact and project for ease of tracking later for follow up for billing purposes, etc. As an example, a user may be a sales person or technical support person or otherwise away from the home office for periods of time wherein the user may be required by reason of their assigned task to call back to the home office or to a corresponding support desk or the like many times during the period they are away about a variety of different matters corresponding to potentially numerous clients and potentially numerous projects associated with individual clients. Thus it is exceedingly useful to that user to be able to associate the time of particular calls to a particular contact and to a particular project even though the user is phoning back to the same phone number throughout the entire time the user is away. Similarly, a single project or a single contact may have several or many different phone numbers all of which need to be allocated for billing purposes to the single project or contact so as to result in a comprehensive and useful billing report. Thus the TEMS handset database allows many-to-many mapping which provides the user flexibility for appropriate tagging so that later processing of the information by the user is minimal and often not required at all. The many to many mapping allows multiple clients to be associated with one (common) number.

In reference now to the logic flow chart illustrations, as seen commencing in FIG. 6, once the TEMS software has been installed into handset 10, as described above, the user must register initially and thereafter the TEMS software will be running in the background during use of the handset. Thus the registration process as outlined in FIG. 6, illustrates the precursor installation 50 of the TEMS software followed by the software looking for a registration flag in step 52. If the registration has already been done then the software in step 54 does a comparison looking for any changes for example the phone number of the device or the memory card (for example a "SIM" card) having changed and in the event that there have been no changes then the software skips directly to the end of the registration process routine. If there have been hardware changes or in the event that there was no registration flag in step 52, the software passes on to step 56 which presents the user with an input screen asking for the user to enter the user's email address for registration purposes following which the user clicks on a "register" button which then takes the software to step 58 where a registration message is created and sent OTA to the TEMS server wirelessly from the handset 10.

Within the registration server in step 60 the email address entered by the user is validated and a unique identification ("ID") generated for the user, a password is created, and an email sent back to the user sending the unique identification which must be kept by the user. The software then passes to step 62 which queries whether the registration and validation process were successful and in the event that the registration and validation process were successful then the software passes to step 64 wherein the server stores the user's unique identification and enables the TEMS software to commence operation in the background of handset 10, following which the registration process routine ends in step 66. In the event that, in step 62, it is determined that the registration or validation process was not successful, the software passes to step 68 which then generates an error code which is sent wirelessly to handset 10 requesting, in step 70 a change to the control password which is then sent to the server. In step 72 the change control password is compared for a match and in that event, that is a match is found, in step 74 the server updates its records and sends the user's unique identification and passes the software on to step 64. In the event that there is no match in step 72, and after three unsuccessful attempts in step 76 the software ends the registration routine in step 66.

In the call tracking process of FIG. 7, a listener routine runs in the background in handset 10 upon the startup in step 80 of the handset 10. Within the listener routine, the TEMS software in step 82 waits for notification of an event from the handset operating system. Where the event is the shutting down of the handset and consequently the shutting down of the software in step 84 the software routine ends in step 86. Where the event in step 82 is a communication event for example where the user is making or receiving a call in step 88, the software in step 90 waits to detect the end of the call, in step 92 determines whether the call as listed in the call log of the handset was a conference call or a missed call in which event further processing of the call is discarded in step 94 and the software returns to step 82. If the call being monitored in step 90 is neither a conference call nor a missed call, the software passes to step 96 where the listener routine detects whether there are ongoing calls on hold and in the event there are and the user will be then moving on to a subsequent call which was on hold, the tagging of the first call in step 90 is postponed and software passes back to step 82 which then passes to step 88 for the subsequent call which was on hold which the user is now engaged in. Again in step 90 once the subsequent call ends the software passes via step 92 to step 96 to determine whether there are yet further calls on hold for the user, and if there are no calls on hold the TEMS software passes via step 98 to the initial process of tagging the call or calls in routine 100.

Within initial tagging routine 100, the software in step 102 determines whether the user has preselected to track phone calls at all and in the event that the user has preselected not to track phone calls then the software passes to step 104 which stops further processing. In the event that calls are to be tracked then software passes from step 102 to step 106 which opens a new call record. The software in step 108 then determines whether the user has selected to track all calls in which event the new call record object is submitted by passing via step 110 to step 112. In the event in step 108 that the software determines that all calls are not necessarily to be tracked, the software passes from step 108 directly to step 112. In step 112 the software compares the phone number for the remote party to the white list or ignore list. In the event that the remote party is on the white list or ignore list, the software passes to step 104 and further processing is stopped. In the event that the remote party is not on the white list or the ignore list, the software passes to step 114 which compares the length of the call to the pre-set threshold time (for example a default of five seconds although this may be changed by the user). In the event that the call time is less than the threshold time, the software passes to step 104 and further processing is stopped. In the event that the call time is greater than the threshold time then the software passes to step 116. In step 116 the call item is pushed into a data queue and the software then passes to step 118 which then forces to the foreground the user interface for example of capture screen 12*a* wherein the software in step 118 may have to repeatedly force the user interface into the foreground of display 12 so as to present the user with capture screen 12*a* rather than any other user interface which might otherwise be presented by handset 10 to the user.

The software then passes to the main activation step 120 activating the call tagging processing. The software passes to step 122 which determines whether there is a call item in the data queue, and if there is not then software passes to step 124 which temporarily puts further processing of the expected call item on hold. In the event that the expected call item is present in the data queue or is subsequently detected in the data queue in step 122, the software passes to step 126 which determines if another item is already being processed. In the event that another item is already being processed, the software passes back to the temporary postponement of further processing in step 124. In the event that another item is not being processed or that subsequently any items that were being processed have been completed, the software passes to step 128 which determines if the queued item is not a telephone call communication event but rather is an email or SMS text message. In the event that the queued item is a call event, in other words, a call record, the software passes to step 130 which then presents to the user a call capture screen 12*a* such as shown by way of example in FIG. 1 and shown diagrammatically in FIG. 8. In FIG. 7, software passes from step 130 to step 132 where the data capture begins, as seen in FIG. 8.

As seen in FIG. 8, which outlines the data capture process, after a communication event such as an email is read by or prepared by the user or a call is made or received by the user, the user is presented with successive screens on handset 10 that allow the user to specify additional information to be attached to the data item, which is then saved in the handset database and which may be transmitted to the TEMS server for collection and analysis. In the exemplary logic flowchart of FIG. 8, the example is given of a call, and so following step 132 in FIG. 7, the user is presented with the call capture screen 12*a* and is prompted to input information, in FIG. 8, starting in step 134. Thus in step 136, the call record object corresponding to the call is shown in a new call capture screen 12*a*. With call capture screen 12*a* displayed to the user, the software passes to step 138 which monitors for input from the user in the form of the user clicking on buttons 18, 20, 22 or 24. Thus if the user clicks on capture button 18 the software then presents call captured screen 36 to the user and monitors in step 140 for user input in screen 36 for example in fields 36*b*-36*h* unless for example fields 36*b* and 36*c* have been auto-filled and then monitors for the user clicking on the submit button 36*i* as better seen in FIG. 3. Returning to call capture screen 12*a* in FIG. 8, if the user instead clicks on the not now button 20 the call record is added to the not now list in step 142 for later processing. If the user instead clicks on dismiss button 22, the call record is added to the dismiss list in step 144 which, unless the user later calls up the list to re-categorize the call, is no longer processed by the software. Alternatively, if the user clicks on the add to white list button 24, then the call record is added to the white list or ignore list in step 146.

Returning now to step 140, when the submit button 36*i* is clicked by the user, the software passes to the submit button processing in step 148 which then passes to step 150 which determines whether the client, project and phone number fields are filled in. If those fields are not filled in, the user is prompted with a pop up reminder in step 152. If the client, project and phone number fields are filled in, or are subsequently filled in (the minimum data required being the phone number) the software passes to step 154 which associates the phone number with a client in the event that the client field was not filled in. The software then passes to step 156 which commences the routine to call the TEMS server so as to pass the call record object to the server. Thus in step 158 the call and client data is formatted to XML and a call submitted to the server. A thread for that call and that call record being submitted to the server is started so that processing of that thread commences along its own timeline so as to free up the user interface of handset 10 for further interaction with the user. In one embodiment the routine of FIG. 8*a* may be implemented to check for a processing backlog, and to deal with the backlog, if any.

Thus in routine 160 the number of the objects active threads are counted in step 162. If it is necessary to retransmit the call record then the software passes through step 164 to step 166 which receives an action code from the backlog, passes to the function mapper in step 168 and the item is retransmitted in step 170.

Returning to step 164, in the event that it is not required to retransmit, the software passes to function mapper step 172 which then passes to a submit call step 174 which then passes to a submit data step 176. An action request is then built in step 178, and that is then sent in step 180 so as to end the data capture process with transmission in step 182.

FIG. 9 illustrates a logic flow chart which is for the tracking of email communication events, and which is similar to the flow chart for tracking telephone call communication events as illustrated in FIG. 7. In FIG. 9 primarily the only difference between that figure and FIG. 7 is in the listener routine where in step 190 the software records the opening and closing of email manually, that is, the routine is not told automatically from the handset system the amount of time which has elapsed whereas in the case of a call the handset system may have determined the call length. Thus in step 190 the amount of time elapsed during which the user has dealt with the email is calculated, and that elapsed time saved in step 192. Thus after the notification of an event in step 82, in the event of an email, a user then opens the email message for viewing or composing in step 194 and the timer commences in step 196 by saving the current time in step 198. The system then notifies of a further event in step 82 with the closing of the email in step 200. Once the user closes the email in step 200 and the software passes to step 190, again the current time is determined and compared to the saved time in step 198 to then derive the elapsed time that the user spent interacting with the email message. Following step 192 the logic flows similarly to FIG. 7 with the exception that in step 112' the query is whether the remote parties to the message are in the white list as opposed to the remote parties to the call, and in step 114' the query is whether the time spent on the message is larger than the threshold rather than the time spent on the call. Further, following step 112', if the remote parties are not in the white list, the software passes to step 202 which determines whether the message is being viewed multiple times and in the event that it is the software in step 204 saves the cumulative time spent interacting with the message and then passes to step 114'. In the event that in step 202 the message is not being viewed multiple times the software directly passes to step 114'. Following step 114' if the time spent on the message is larger than the configured threshold time then the software passes to step 206 which determines if the message is a draft, and in the event that the message is a draft, the software passes to step 104 to stop further processing. In the event that the message is not a draft the software passes to step 208 to recognize the message as a new email record, and that item then pushed into the data queue in step 116.

Figure 10:
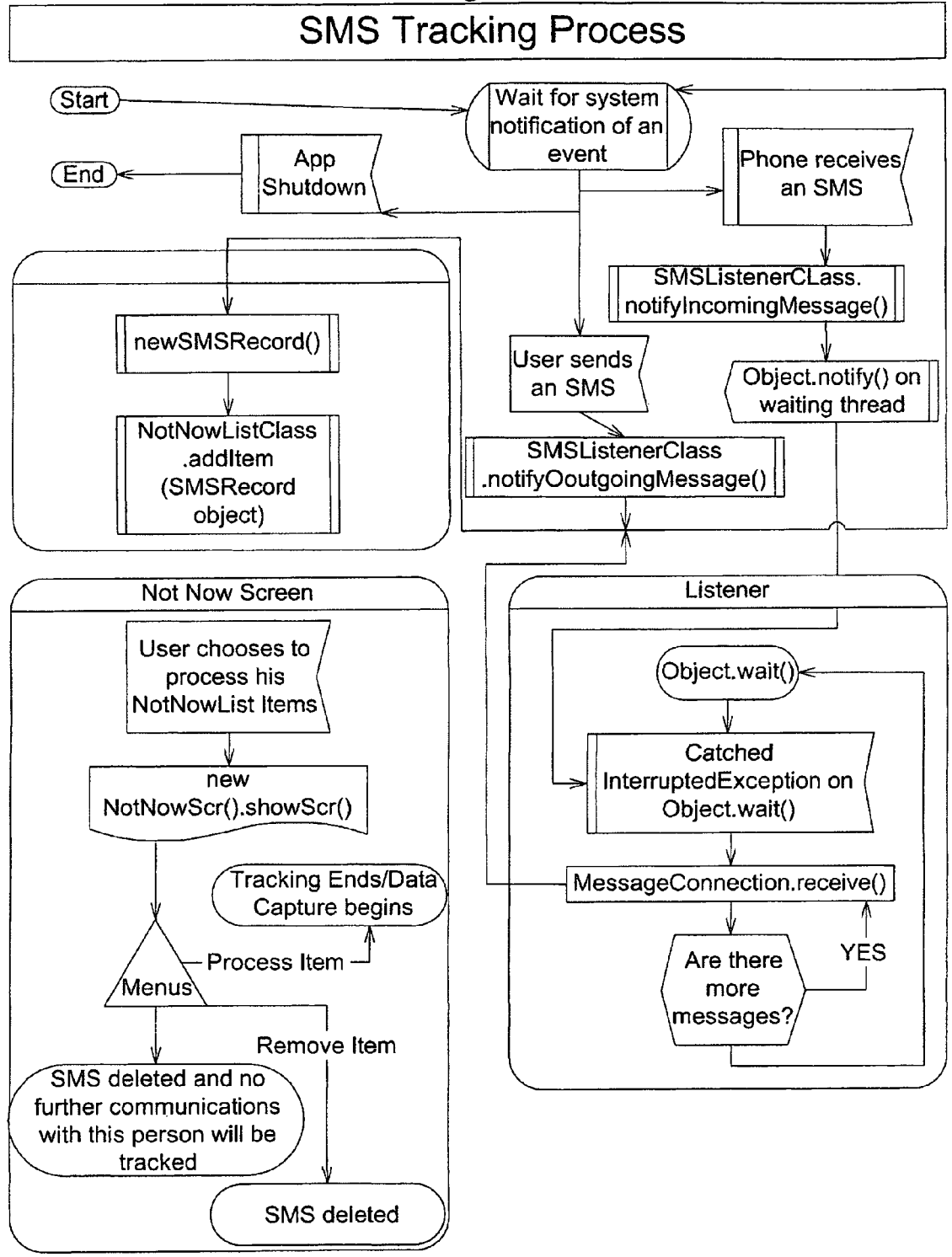
FIG. 10 is a logic flow chart for the SMS text tracking process according to yet a further aspect of the present invention.

In FIG. 10 a similar logic flow chart is illustrated for the case of a SMS text messaging being tracked. One distinction however is that an SMS text message in this embodiment is automatically sent to the not now list as in this embodiment it is presumed that the start and stop of an SMS text message cannot be detected. Thus in the case of SMS texting, because the time of the interaction with the message is not being determined, there is no preset threshold based on time. Rather the preset threshold may be based on the number of characters for example twenty characters in the message as the threshold for the SMS tracking process to continue.

With respect to the reporting service of the TEMS of the present invention, in one embodiment, in conjunction with a user having the user's monthly carrier bill which, as mentioned above, will ordinarily be a mere listing of phone numbers and call duration, the user will request a TEMS report which may if requested provide all the tagged information for all of the tagged calls in the billing period corresponding to the monthly carrier bill. The user then easily correlates the calls for billing to the contact of both time and expenses, including the cost of the calls paid to the carrier.

Figure 11:
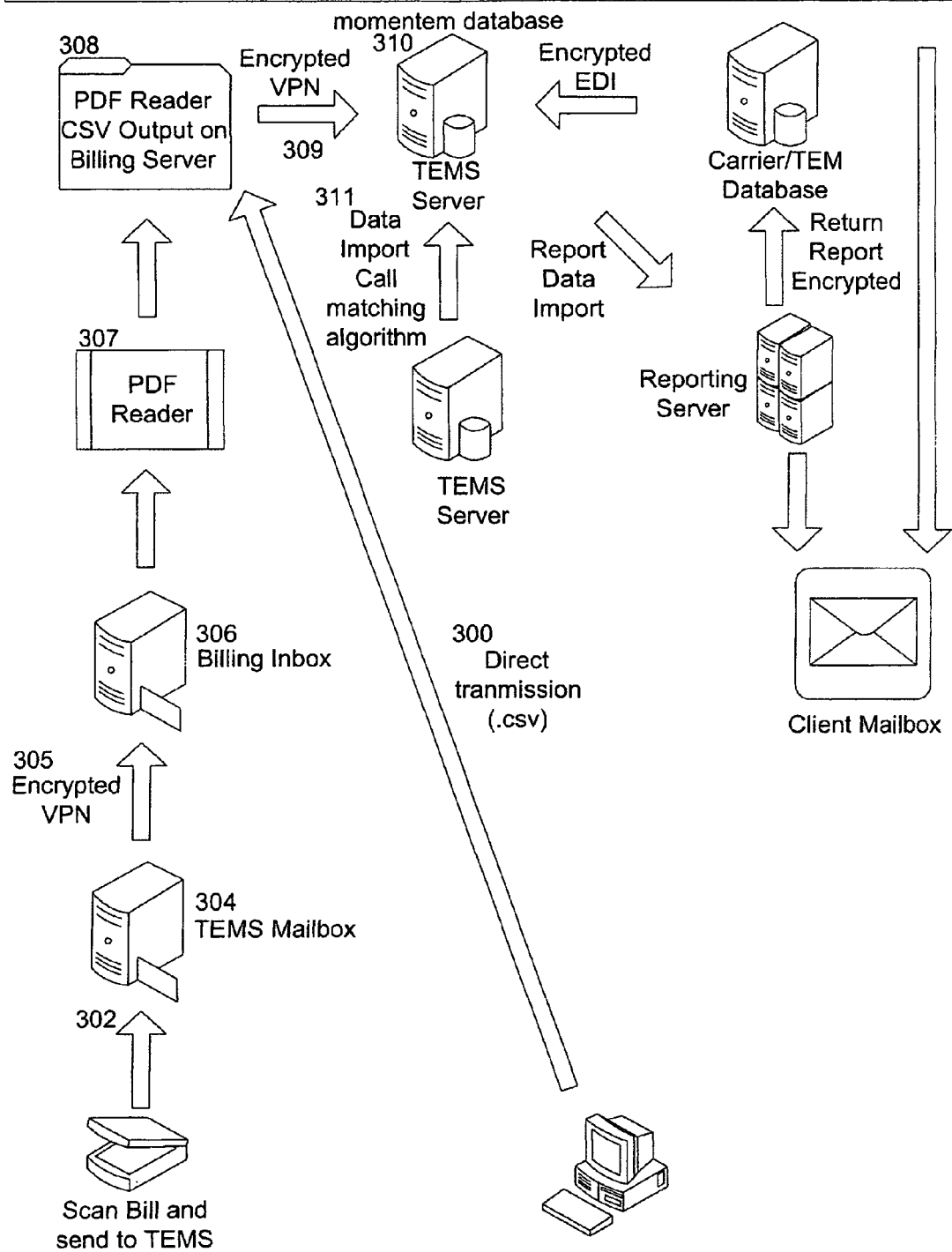
FIG. 11 is a flow chart for a report matching process according to one aspect of the present invention, wherein carrier's reports are matched to tagged call information so as to generate a comprehensive combined report.

In a further embodiment, a copy of the carrier's monthly bill is either obtained electronically by the TEMS server (step 300 in FIG. 11) or submitted by the user to the TEMS server in step 302 for example by the user scanning the bill to a pdf format, such as provided for by Adobe™, and emailing the scanned pdf image to the TEMS server. If the TEMS server receives the pdf file of the carrier's bill in its mailbox 304, pdf format reading software such as supplied for example by Validas™ is sent an encrypted file in step 305 to its inbox 306. The pdf file of the carrier's bill is then decoded to extract the text (including all text and numerals) of the carrier's bill in processing step 307, and provided as a usable output 308, for example in CSV format, on the Validas™ server.

The CSV output is then sent in step 309 as an encrypted file to the TEMS server 310 and in particular to the TEMS or Momentem™ Database therein. The TEMS data from the tagged calls for the user are then imported in step 311 into a call matching algorithm. The call matching algorithm matches the tagged calls to the corresponding user's calls reported on the carrier's monthly bill. The algorithm increases the likelihood of correct matches by for example employing a hierarchy of data to match in terms of priority. As a first priority for example, the algorithm matches the date of the call (month, day), and from those matches then matches time of the call, and from those matches (if still further screening is required to locate a single corresponding match), the algorithm matches duration of call (with time round-up to the nearest minute, as done by the carrier), and of course phone number for the remote party to the call. Once the algorithm has a threshold confidence level for a match, the tagged information is merged with the call cost from the carrier's bill and a merged report line for that call is ready for reporting. The process continues until all tagged calls have been matched from the carrier's bill, and a comprehensive report can then be produced for the user, or the report is generated showing any possible mismatches that did not meet the threshold confidence level.

As will be apparent to those skilled in the art in the light of the foregoing disclosure, many alterations and modifications are possible in the practice of this invention without departing from the spirit or scope thereof.

What is claimed is:

1. A telecom expense management system for use with a wireless handset having a processor, handset database and user interface and a remote server having a server database wherein the server is in wireless communication with the handset, the system comprising:
a) means for detecting a communication event, means for determining event identification information associated with said communication event, and means for detecting an associated end of said communication event,
b) means for detecting the occurrence of a pre-selected event, and then triggering an automatic tagging of said communication event,
c) means for automatically tagging said communication event upon said triggering,
d) means for providing a user a choice after said end and before said occurrence of said pre-selected event, wherein said choice includes choices from the group comprising at least a tagging choice, a process-later choice, a dismiss choice, an add-to-ignore list choice,
e) means for maintaining a process-later list and an ignore list,
wherein said tagging choice includes means for tagging said communication event so as to associate with said communication event a billable quantity corresponding to said communication event, and so as to associate contextual information with said communication event, wherein said billable quantity includes billable quantities chosen from the group comprising: time duration of said event, and wherein said contextual information comprises at least all of the information in the group comprising: contact information for a remote party communicating with the user during said communication event, project information associated with the remote party and said communication event, a billing rate for said communication event, expenses added by the user, contextual notes added by the user, and wherein said tagging choice further includes a reminder choice chosen from: forwarding a reminder communication containing said contextual information to the user, forwarding a reminder communication containing said contextual information to the remote party,
wherein said process-later choice includes means for listing said event identification information in a process-later list and means for the user to later access said process-later list for said tagging of one or more of said communication events in said process-later list,
wherein said dismiss choice includes means for identifying said communication event as not requiring said tagging,
wherein said add-to-ignore list choice includes means for listing said event identification information in said ignore list so that future said communication events associated with said event identification information in said ignore list do not result in said providing the user with said choice,
wherein said automatic tagging includes means for said tagging of said communication event with said billable quantity and with at least a sub-set of said contextual information comprising: said contact information.

2. The system of claim 1 wherein said means for providing a user a choice includes a field containing the remote party's telecom information from the group comprising: phone number, email address, SMS address, and wherein said means for providing a choice further includes means for mapping from one of the databases an identity of the remote party corresponding to said remote party's telecom information, and wherein said means for providing a choice further includes means for displaying an identification field populated from one of the databases with said identity of the remote party if found.

3. The system of claim 2 further comprising a means for providing a menu of choices to the user independent of said detection of said communication event, wherein said menu of choices includes menu choices from the group comprising: reviewing a contacts list, reviewing said process-later list, reviewing said ignore list, tagging expenses, tagging activities, requesting reports associated with said communication events, requesting synchronization of the handset database with the server database.

4. The system of claim 2 wherein said means for tagging includes means for automatically determining said billable quantity and adding said billable quantity to tagged information tagged to said communication event.

5. The system of claim 4 wherein said means for tagging includes means for automatically mapping said telecom information to one of the databases and returning any corresponding said contextual information from the databases and automatically adding said corresponding contextual information to said tagged information tagged to said communication event.

6. The system of claim 5 wherein said communication event is a call, said telecom information is a phone number, and said billable quantity is elapsed time of the call.

7. The system of claim 5 wherein said communication event is an email, said telecom information is an email address, and said billable quantity is the amount of time an email is open so as to allow the user to read it and the amount of time during which an email is being generated including text being written, whether any segments of the amount of time thereof are contiguous or sequential or piece-meal.

8. The system of claim 2 wherein said mapping includes many-to-many mapping.

9. The system of claim 6 wherein said pre-selected event includes when said elapse of time equates to said preset default time interval, and further comprising means for commencing tracking elapse of time from said end of said communication event and comparing said elapse of time to said preset default time interval, and further comprising means for detecting when said elapse of time equates to said pre-set default time interval.

10. The system of claim 5 wherein said means for providing a user a choice is made available to the user immediately upon said end of said communication event by means for displaying of a capture screen on the handset.

11. The system of claim 10 further comprising means for over-riding other handset prompts in order to display said capture screen upon said end of said communication event.

12. The system of claim 10 wherein said means for displaying of said capture screen includes means for displaying: a tagging icon for initiating said tagging choice, a process-later icon for initiating said process-later choice, a dismiss icon for initiating said dismiss choice, and an add-to-ignore list icon for initiating said add-to-ignore list choice.

13. The system of claim 12 wherein said means for providing a user a choice further includes means for displaying a reporting icon for initiating generation of at least one report to the user.

14. The system of claim 13 wherein said report is chosen from the group comprising: a summary report.

15. The system of claim 12 wherein said means for displaying a tagging icon, when selected by the user, triggers a means for displaying a captured-event screen displaying said telecom identification, said billable quantity, and said contextual information.

16. The system of claim 12 wherein said means for providing a user a choice further includes means for displaying a synchronization icon for initializing synchronization of the handset database with the server database.

17. The system of claim 1 further comprising:
f) means for gathering and storing identifying information from at least the handset identifying the handset and the user upon installation of a handset program component of the system so as to be resident in the handset and subsequently upon each start-up of the handset,
g) means for automatically commencing operation of said handset program component of the system upon said start-up of the handset,
h) means for prompting the user for the user's email address upon said installation and storing the user's email address upon said installation,
i) means for creating a unique user identification from said identifying information and storing said unique user identification in said server upon said installation,
j) means for creating and storing a password for the user upon said installation,
k) means for comparing said identifying information which has been stored with said identifying information in the handset upon each said start-up of the handset and detecting any changes in said identifying information,
l) means for prompting the user for said password upon said detection of any changes, verifying the user's input password upon said prompting with said stored password,
m) upon successful verification of said input password with said stored password then means for restoring said identifying information containing any said changes in said identifying information whereby said identifying information, including said changes, automatically follows the user upon any said changes to at least the handset.

18. The system of claim 17 wherein said identifying information is chosen from the device related information including the IMEI, PIN, ESN, IMSI, user's phone number and Home Zone.

19. The system of claim 17 wherein said identifying information includes the users email address once the user's email address has been stored following said installation.

20. The system of claim 17 wherein said means for creating a unique user identification includes means for creating a hash of said identifying information.

21. A telecom expense management method for use with a wireless handset having a processor and handset database and a remote server having a server database wherein the server is in wireless communication with the handset,
the method comprising the steps of:
a) detecting a communication event, determining event identification information associated with said communication event, and detecting an associated end of said communication event,
b) detecting the occurrence of a pre-selected event, and then triggering an automatic tagging of said communication event,
c) automatically tagging said communication event upon said triggering,
d) providing a user a choice after said end and before said occurrence of said pre-selected event, wherein said choice include choices from the group comprising at least a tagging choice, a process-later choice, a dismiss choice, an add-to-ignore list choice,
e) maintaining a process-later list and an ignore list,
wherein said tagging choice includes tagging said communication event so as to associate with said communication event a billable quantity corresponding to said communication event, and so as to associate contextual information with said communication event, wherein said billable quantity includes billable quantities chosen from the group comprising: time duration of said event, and wherein said contextual information comprises at least all of the information in the group comprising: contact information for a remote party communicating with the user during said communication event, project information associated with the remote party and said communication event, a billing rate for said communication event, expenses added by the user, contextual notes added by the user, and wherein said tagging choice further includes a reminder choice chosen from: forwarding a reminder communication containing said contextual information to the user, forwarding a reminder communication containing said contextual information to the remote party,
wherein said process-later choice includes listing said event identification information in a process-later list and later providing for the user access to said process-later list for said tagging of one or more of said communication events in said process-later list,
wherein said dismiss choice includes identifying said communication event as not requiring said tagging,
wherein said add-to-ignore list choice includes listing said event identification information in said ignore list so that future said communication events associated with said event identification information in said ignore list do not result in said providing the user with said choice,
wherein said automatic tagging includes said tagging of said communication event with said billable quantity and with at least a sub-set of said contextual information comprising: said contact information.

22. The method of claim 21 wherein said providing a user a choice includes providing a field containing the remote party's telecom information from the group comprising: phone number, email address, SMS address, and wherein said providing a choice further includes mapping from one of the databases an identity of the remote party corresponding to said remote party's telecom information, and wherein said providing a choice further includes displaying an identification field populated from one of the databases with said identity of the remote party if found.

23. The method of claim 22 further comprising providing a menu of choices to the user independent of said detection of said communication event, wherein said menu of choices includes menu choices from the group comprising: reviewing a contacts list, reviewing said process-later list, reviewing said ignore list, tagging expenses, tagging activities, requesting reports associated with said communication events, requesting synchronization of the handset database with the server database.

24. The method of claim 22 wherein said tagging includes automatically determining said billable quantity and adding said billable quantity to tagged information tagged to said communication event.

25. The method of claim 24 wherein said tagging includes means for automatically mapping said telecom information to one of the databases and returning any corresponding said contextual information from the databases and automatically adding said corresponding contextual information to said tagged information tagged to said communication event.

26. The method of claim 25 wherein said communication event is a call, said telecom information is a phone number, and said billable quantity is elapsed time of the call.

27. The method of claim 25 wherein said communication event is an email, said telecom information is an email address, and said billable quantity is the amount of time during which an email is being generated including text being written, whether any segments of the amount of time thereof are contiguous or sequential or piece-meal.

28. The method of claim 22 wherein said mapping includes many-to-many mapping.

29. The method of claim 26 wherein said pre-selected event includes when said elapse of time equates to said preset default time interval, and further comprising commencing tracking elapse of time from said end of said communication event and comparing said elapse of time to said preset default time interval, and further comprising detecting when said elapse of time equates to said pre-set default time interval.

30. The method of claim 25, wherein said providing a user a choice is made available to the user immediately upon said end of said communication event by displaying of a capture screen on the handset.

31. The method of claim 30 further comprising over-riding other handset prompts in order to display said capture screen upon said end of said communication event.

32. The method of claim 30 wherein said displaying of said capture screen includes displaying: a tagging icon for initiating said tagging choice, a process-later icon for initiating said process-later choice, a dismiss icon for initiating said dismiss choice, and an add-to-ignore list icon for initiating said add-to-ignore list choice.

33. The method of claim 32 wherein said providing a user a choice further includes displaying a reporting icon for initiating generation of at least one report to the user.

34. The method of claim 33 wherein said report is chosen from the group comprising: a summary report.

35. The method of claim 32 wherein said displaying a tagging icon, when selected by the user, triggers a displaying a captured-event screen displaying said telecom identification, said billable quantity, and said contextual information.

36. The method of claim 32 wherein said providing a user a choice further includes displaying a synchronization icon for initializing synchronization of the handset database with the server database.

37. The method of claim 21 further comprising the steps of:
f) gathering and storing identifying information from at least the handset identifying the handset and the user upon installation of a handset program component of the system so as to be resident in the handset and subsequently upon each start-up of the handset,
g) automatically commencing operation of said handset program component of the system upon said start-up of the handset,
h) prompting the user for the user's email address upon said installation and storing the user's email address upon said installation,
i) creating a unique user identification from said identifying information and storing said unique user identification in said server upon said installation,
j) creating and storing a password for the user upon said installation,
k) comparing said identifying information which has been stored with said identifying information in the handset upon each said start-up of the handset and detecting any changes in said identifying information,
l) prompting the user for said password upon said detection of any changes, verifying the user's input password upon said prompting with said stored password,
m) upon successful verification of said input password with said stored password then re-storing said identifying information containing any said changes in said identifying information whereby said identifying information, including said changes, automatically follows the user upon any said changes to at least the handset.

38. The method of claim 37 wherein said identifying information is chosen from the device related information including the IMEI, PIN, ESN, IMSI, user's phone number and Home Zone.

39. The method of claim 37 wherein said identifying information includes the user's email address once the user's email address has been said stored following said installation.

40. The method of claim 37 wherein the wireless communication between the handset and server uses a protocol, and said protocol includes the steps of:

a) sending the communication bi-directionally between the handset and server in real time independent of third party middleware but able to pass through third party middleware,
b) supporting in the communication internal messaging transaction data encapsulated using XML standard but with customized tags for describing the data,
c) utilizing a communications stack so as to provide for information to be passed between the handset and server, said information including registration information, transaction information, error codes including network, data and server errors codes and other information including user notifications and updates.

41. The method of claim 40 wherein bi-directional communication is fault tolerant incorporating the use of a data backlog and transmission verification enabling incomplete, corrupted or interrupted data transmissions to be resent.

42. The method of claim 37 wherein said creating a unique user identification includes the step of creating a hash of said identifying information.

43. The systems of claim 17 wherein the wireless communication between the handset and server includes:
a) means for sending the communication bi-directionally between the handset and server in real time independent of third party middleware but able to pass through third party middleware,
b) means for supporting in the communication internal messaging transaction data encapsulated using XML standard but with customized tags for describing the data,
c) means for utilizing a communications stack so as to provide for information to be passed between the handset and server, said information including registration information, transaction information, error codes including network, data and server errors codes and other information including user notifications and updates.

44. The system of claim 43 wherein bi-directional communication is fault tolerant incorporating the use of a data backlog and transmission verification enabling incomplete, corrupted or interrupted data transmissions to be resent.

45. The system of claim 17 wherein said means for creating a unique user identification includes means for creating a bash of said identifying information.

* * * * *